(12) United States Patent
Moeller

(10) Patent No.: US 10,948,329 B2
(45) Date of Patent: Mar. 16, 2021

(54) INTELLIGENT CONTAINER MANAGEMENT

(71) Applicant: MyOmega Systems GmbH, Nuremberg (DE)

(72) Inventor: Bernd Moeller, Henfenfeld (DE)

(73) Assignee: MyOmega Systems GmbH, Nuremberg (DE)

( * ) Notice: Subject to any disclaimer, the term of this patent is extended or adjusted under 35 U.S.C. 154(b) by 314 days.

(21) Appl. No.: 16/015,413

(22) Filed: Jun. 22, 2018

(65) Prior Publication Data

US 2019/0272495 A1 Sep. 5, 2019

Related U.S. Application Data

(60) Provisional application No. 62/637,828, filed on Mar. 2, 2018.

(51) Int. Cl.
*G01F 23/00* (2006.01)
*G01F 23/296* (2006.01)
*G06Q 10/08* (2012.01)
*G06Q 50/28* (2012.01)

(52) U.S. Cl.
CPC ........ *G01F 23/0061* (2013.01); *G01F 23/296* (2013.01); *G01F 23/2962* (2013.01); *G06Q 10/083* (2013.01); *G06Q 10/087* (2013.01); *G06Q 10/0832* (2013.01); *G06Q 50/28* (2013.01)

(58) Field of Classification Search
USPC ........................................................ 702/55
See application file for complete search history.

(56) References Cited

U.S. PATENT DOCUMENTS

| 2016/0022209 A1* | 1/2016 | Fraisl ................... A61B 5/7282 600/590 |
| 2016/0158423 A1 | 6/2016 | Pigazzi |
| 2016/0162832 A1 | 6/2016 | Thompson et al. |
| 2017/0086011 A1* | 3/2017 | Neves ................... H04B 1/3822 |
| 2018/0039314 A1* | 2/2018 | Chennakeshu ....... G06F 1/3296 |
| 2018/0061207 A1 | 3/2018 | Nygren et al. |

(Continued)

FOREIGN PATENT DOCUMENTS

| CA | 3 003 645 | 6/2017 |
| DE | 3632855 A1 | 3/1988 |
| WO | WO 2016/115400 A1 | 7/2016 |

*Primary Examiner* — Paul D Lee

(74) *Attorney, Agent, or Firm* — Muirhead and Saturnelli, LLC

(57) ABSTRACT

Managing a lifecycle of a container includes defining a plurality of states, each state corresponding to a particular phase in the lifecycle of the container, determining one or more current properties of the container while a current defined state of the container is in a first defined state of the plurality of defined states, and controlling an action associated with the container based on at least the first defined state and the one or more determined properties of the container. Determining one or more current properties of the container may include determining a current fill level of the container and information about at least one other current physical property of the container. Controlling an action may include changing the defined state of the container from the first defined state to a second defined state of the plurality of defined states.

30 Claims, 15 Drawing Sheets

(56) References Cited

U.S. PATENT DOCUMENTS

2018/0336515 A1* 11/2018 Mehring ............... H04L 9/0637
2018/0357597 A1* 12/2018 Magatti ................ A47J 31/521
2018/0365964 A1* 12/2018 Carson ................. G01J 1/0219

* cited by examiner

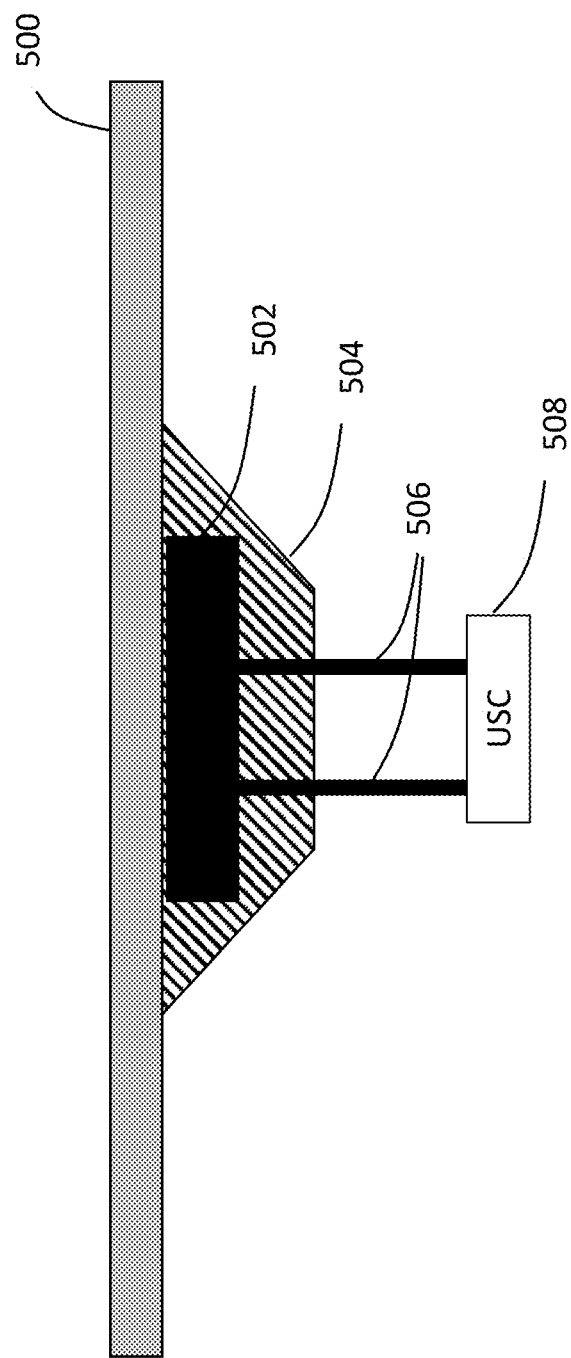

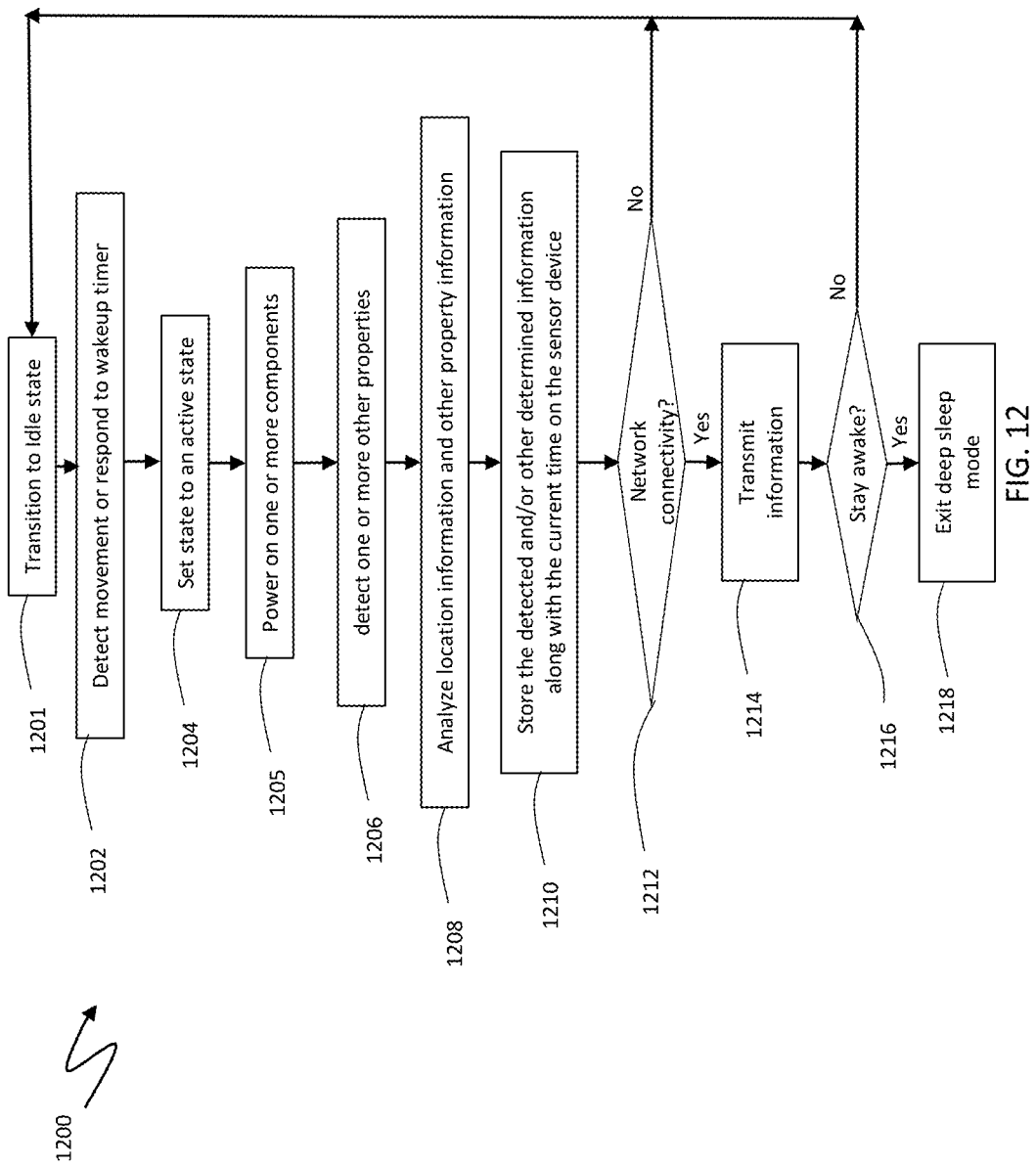

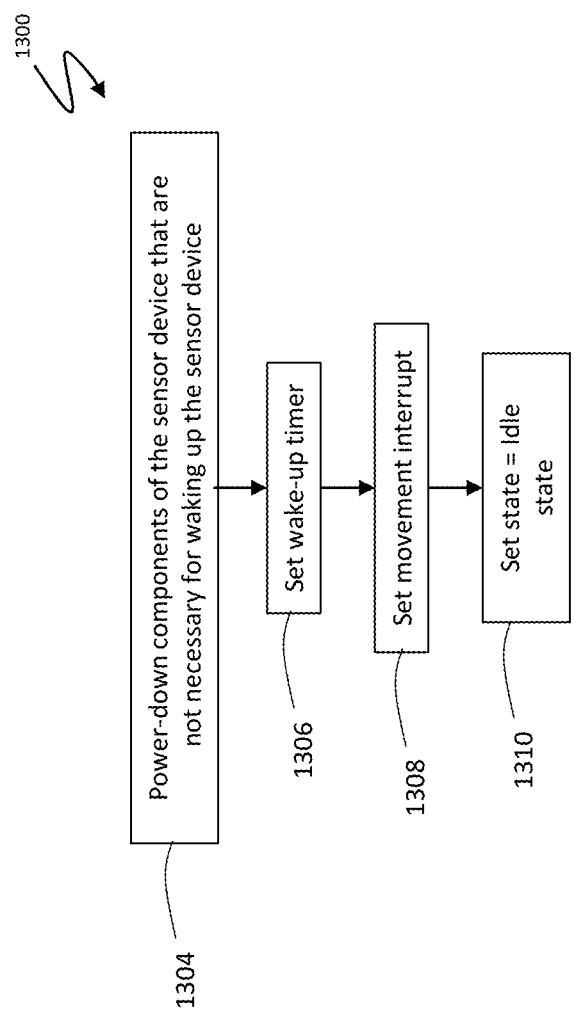

INTELLIGENT CONTAINER MANAGEMENT

CROSS-REFERENCE TO RELATED APPLICATION

This application claims priority to U.S. provisional patent application No. 62/637,828 filed on Mar. 2, 2018 titled "IBC Monitoring," which is incorporated by reference herein.

TECHNICAL FIELD

This application is directed to the field of remote monitoring and management of things, and more particularly to remote monitoring and management of containers.

BACKGROUND OF THE INVENTION

An intermediate bulk container (IBC) is an industrial-grade reusable container designed for the transport and storage of food, ingredients, beverages, chemistry, pharmacy, cosmetics, liquids, etc. In addition, special types of IBC containers exist for solid materials. The term "intermediate bulk container" or "IBC" as used herein, includes IBCs, transport tanks, bulk container, solid material container, an EcoBulk® Schütz brand container, a RecoBulk® Schütz brand container, or any suitable variation or combination of the foregoing.

Special types of IBCs have been developed to manage the challenges of specific transport cases or receiving environments such as, for example, antiseptic IBCs, electrostatic discharge (ESD) or anti-static IBCs, ATEX-compliant IBCs for explosives, IBCs including inlays to avoid cleaning processes or to support hygienic requirements, coated IBCs, etc. Further, IBCs may be made of different materials, for example, different types of plastics, aluminum, steel, other materials or any suitable combination of the foregoing. Variations of IBC also exist for the management of special cases such as, for example, solutions for the food industry or other industries; solutions that support the filling or emptying of the IBCs; and for certain substrates, solutions for powders and/or solid bulk materials, and any suitable combination of the foregoing.

During the lifecycle of an IBC, various parties may handle the IBC, including what are referred to herein as an IBC producer, an OEM and a customer. The IBC producer is a manufacturer of the IBC; the OEM is a company or other entity that sells the goods (e.g., liquid or solid material) contained within the IBC; and the customer is the entity that consumes the goods. For example, the lifecycle of a liquid IBC may include the following phases: an IBC producer produces an IBC or prepares a used IBC; An OEM further prepares the IBC, which may include repair and cleaning of the IBC; the OEM fills the container; the IBC is transported to a customer; the customer consumes the liquids, for example, in one or more iterations; and one of the following three paths are taken: the IBC reaches its end-of-life (EoL), i.e., is EoLed or discarded, the IBC is returned to the IBC producer, who performs services like cleaning and repairing; or the IBC is returned to the OEM, who prepares the IBC (i.e., repeats preparing phase above).

Technologies in use today for monitoring IBCs include sensors for detecting the fill level of an IBC, cellular machine-to-machine (M2M modems) and GPS technologies for detecting a geographic location of a container, and RFID tags for identifying IBCs and their contents.

What is desired is a more holistic solution for remotely managing the lifecycle of IBCs in a flexible, reliable, efficient and comprehensive manner.

SUMMARY OF THE INVENTION

In some embodiments of the system described herein, a method of managing a lifecycle of a container is performed. The method includes defining a plurality of states, each state corresponding to a particular phase in the lifecycle of the container, determining one or more current properties of the container while a current defined state of the container is in a first defined state of the plurality of defined states, and controlling an action associated with the container based on at least the first defined state and the one or more determined properties of the container. Determining one or more current properties of the container may include determining a current fill level of the container and information about at least one other current physical property of the container. Controlling an action may include changing the defined state of the container from the first defined state to a second defined state of the plurality of defined states. A sensor device including a plurality of components may be physically coupled to the container, and the method may further include setting the current defined state to an idle state, and powering down one or more of the plurality of components of the sensor device in accordance with the current defined state being the idle state. Powering down one or more of the plurality of components of the sensor device may include powering down all of the components of the sensor device except for components required to wake-up the sensor device. The method may further include waking up the sensor device in response to detection of movement or to reaching a predefined time, in response to waking up the sensor device, powering on one or more of the plurality of one or more powered-down components, and setting the current defined state to the first defined state, and determining whether or not to return the current state to the idle state based on the determined one or more properties. The defined states may include at least one state corresponding to at least one of the following: production of the container, preparation and/or filling of the container, monitoring the container at a customer site, and transport of the container. A sensor may be physically coupled to the container, and the sensor may determine one or more current properties of the container and controls an action associated with the container. The sensor may be remotely coupled to a container management network and controlling an action may include controlling the action based at least in part on information received from the management network. Determining one or more current properties of the container may be performed multiple times over a period of time, and the method may further include estimating an expiration date or use-by date of contents of the container based at least in part on the current properties of the container determined multiple times over a period of time. The first defined state may be a state during which contents of the container are consumed at a customer site, and the method may further include tracking a number of times an emptying event of the container occurs during the first defined state. The method may further include communicating information about the container to the one or more devices of a container management network as transaction blocks of a blockchain. The method may further include transmitting sound waves into the container, and determining one or more current properties of the container may include detecting sound waves from the container in response to acoustic stimulation of the container to determine the one or more properties.

In some embodiments of the system described herein, one or more non-transitory computer-readable media having software stored thereon for managing a lifecycle of a container may be provided. The software includes executable code that defines a plurality of states, each state corresponding to a particular phase in the lifecycle of the container, and executable code that determines one or more current properties of the container while a current defined state of the container may be in a first defined state of the plurality of defined states, and executable code that controls an action associated with the container based on at least the first defined state and the one or more determined properties of the container. The executable code that determines one or more current properties of the container may include executable code that determines a current fill level of the container and executable code that determines information about at least one other current physical property of the container. The executable code that controls an action may include the executable code that changes the defined state of the container from the first defined state to a second defined state of the plurality of defined states. A sensor device including a plurality of components may be physically coupled to the container, and the software may further include executable code that sets the current defined state to an idle state, and executable code that controls powering down one or more of the plurality of components of the sensor device in accordance with the current defined state being the idle state. The executable code that controls powering down one or more of the plurality of components of the sensor device may include executable code that controls powering down all of the components of the sensor device except for components required to wake-up the sensor device. The software may further include executable code that wakes up the sensor device in response to detection of movement or to reaching a predefined time, and executable code that, in response to waking up the sensor device, powers on one or more of the plurality of one or more powered-down components, and sets the current defined state to the first defined state, and executable code that determines whether or not to return the current state to the idle state based on the determined one or more properties. The defined states include at least one state corresponding to at least one of the following: production of the container, preparation and/or filling of the container, monitoring the container at a customer site, and transport of the container. A sensor may be physically coupled to the container, and the sensor may include the executable code that determines the one or more current properties of the container and the executable code that controls the action associated with the container. The sensor may be remotely coupled to a container management network and the executable code that controls the action may include executable code that controls the action based at least in part on information received from the management network. The executable code that determines one or more current properties of the container determines the one or more current properties multiple times over a period of time, The software may further include executable code that estimates an expiration date or use-by date of contents of the container based at least in part on the current properties of the container determined multiple times over a period of time. The first defined state may be a state during which contents of the container are consumed at a customer site, and the software may further include executable code that tracks a number of times an emptying event of the container occurs during the first defined state. The software may further include executable code that communicates information about the container to the one or more devices of a container management network as transaction blocks of a blockchain. The executable code that determines one or more current properties of the container may include executable code that controls detecting sound waves from the container in response to acoustic stimulation of the container and analyzes the detected sound waves to determine the one or more properties.

In some embodiments of the system described herein, a sensor device for monitoring a container is provided. The sensor device includes a first sensor that detects signals indicative of a level to which a container is filled with contents, a second sensor that detects at least a first property of the container other than the level to which a container is filled with contents, and a processing unit coupled to the first sensor and the second sensor, the processing unit having a first interface to communicate with the first sensor, and a second interface to communicate with the second sensor. The sensor device monitors the level and the at least a first property of the container. The sensor device may be physically coupled to the container. The sensor device may further include an ultrasonic sensor controller coupled to the first sensor and the processing unit, where the ultrasonic sensor controller processes signals detected by the first sensor to determine the level to which the container may be filled with the contents. The sensor device may further include a housing that houses the processing unit and the ultrasonic sensor controller. The processing unit may be integrated with the ultrasonic sensor controller on a printed circuit board. The ultrasonic sensor controller may be one of a plurality of ultrasonic sensor controllers, each ultrasonic sensor controller coupled to the processing unit and a respective container. The sensor device may further include a movement sensor that detects movement of the sensor device. The sensor device may further include an integrated ambient light sensor to detect damage to the sensor device. The sensor device may further include one or more network interfaces to communicate status information of the container to a container management network. The sensor device may further include a trusted platform module to secure information stored on and/or communicated from the sensor device. The processing unit may determine action to be taken for the container based on the level and the detected at least first property, and may control taking the action. The processing unit may include a third interface for communicating information about the container to the one or more devices of a container management network as transaction blocks of a blockchain. The processing unit may include a third interface to receive a remotely transmitted digitally signed software update, and logic to authenticate the software update and, if the software may be authentic, update software on the at least one sensor device with the authenticated software. The processing unit may include a climate sensor that provides at least one of temperature, air pressure, and air humidity of the sensor device. The climate sensor may include a pressure compensation membrane such that the climate sensor detects one or more environmental properties external to the sensor device. The processing unit may be coupled to an external temperature array sensor that detects a temperature difference between the contents of the container and gas/air within the container, from which the level of the contents may be determined. The processing unit may determine a property of the container based on sound waves captured by a microphone as a result of acoustic stimulation of the container. The processing unit may digitally sample sound waves captured by a microphone as a result of acoustic stimulation of the container, and transmits the digital samples to a component of a container management system for frequency analysis.

BACKGROUND OF THE INVENTION

In some embodiments of the system described herein, a method of monitoring a container with a sensor device having a first sensor that detects signals indicative of a level to which a container is filled with contents and a second sensor that detects at least a first property of the container other than the level to which a container is filled with contents is performed. The method may include the sensor device communicating with the first sensor, the sensor device communicating with the second sensor, and the sensor device monitoring the level and the at least a first property of the container. The sensor device may be physically coupled to the container. The method may further include the sensor device using an ultrasonic sensor controller coupled to the first sensor and the processing unit to process signals detected by the first sensor to determine the level to which the container may be filled with the contents. The method may further include detecting movement of the sensor device. The method may further include detecting damage to the sensor device. The method may further include communicating status information of the container to a container management network. The method may further include securing information stored on and/or communicated from the sensor device. The method may further include determining action to be taken for the container based on the level and the detected at least first property and controlling taking the action. The method may further include communicating information about the container to the one or more devices of a container management network as transaction blocks of a blockchain. The method may further include receiving a remotely transmitted digitally signed software update, authenticating the software update, and if the software is authentic, updating software on the at least one sensor device with the authenticated software. The second sensor may be a climate sensor that detects at least one of: temperature, air pressure, and air humidity of the sensor device. The climate sensor may include a pressure compensation membrane such that the climate sensor detects one or more environmental properties external to the sensor device. The method may further include detecting a temperature difference between the contents of the container and gas/air within the container, and determining the level of the contents from the detected temperature difference. The method may further include determining a property of the container based on sound waves captured by a microphone as a result of acoustic stimulation of the container. The method may further include digitally sampling sound waves captured by a microphone as a result of acoustic stimulation of the container, and transmitting the digital samples to a component of a container management system for frequency analysis.

In some embodiments of the invention, one or more non-transitory computer-readable media may be provided having software stored thereon for monitoring a container with a sensor device having a first sensor that detects signals indicative of a level to which a container is filled with contents and a second sensor that detects at least a first property of the container other than the level to which a container is filled with contents. The software includes executable code that communicates with the first sensor, executable code that communicates with the second sensor, and executable code that monitors the level and the at least a first property of the container. The sensor device may be physically coupled to the container. The software may further include executable code that uses an ultrasonic sensor controller coupled to the first sensor and the processing unit to process signals detected by the first sensor to determine the level to which the container is filled with the contents. The software may further include executable code that detects movement of the sensor device. The software may further include executable code that detects damage to the sensor device. The software may further include executable code that communicates status information of the container to a container management network. The software may further include executable code that secures information stored on and/or communicated from the sensor device based on data stored within a trusted platform module. The software may further include executable code that determines action to be taken for the container based on the level and the detected at least first property and controlling taking the action. The software may further include executable code that communicates information about the container to the one or more devices of a container management network as transaction blocks of a blockchain. The software may further include executable code that receives a remotely transmitted digitally signed software update, executable code that authenticates the software update, and executable code that, if the software is authentic, updates software on the at least one sensor device with the authenticated software. The second sensor may be a climate sensor that detects at least one of: temperature, air pressure, and air humidity of the sensor device. The climate sensor may include a pressure compensation membrane such that the climate sensor detects one or more environmental properties external to the sensor device. The software further may include executable code that controls detecting a temperature difference between the contents of the container and gas/air within the container, and executable code that determines the level of the contents from the detected temperature difference. The software may further include executable code that determines a property of the container based on sound waves captured by a microphone as a result of acoustic stimulation of the container. The software may further include executable code that digitally samples sound waves captured by a microphone as a result of acoustic stimulation of the container, and executable code that transmits the digital samples to a component of a container management system for frequency analysis.

In some embodiments of the system described herein, the system is for managing a lifecycle of each of a plurality of containers remotely located from one or more servers having at least a first database defining information for managing the lifecycles of the plurality containers, each of the plurality of containers having a sensor device physically coupled thereto. The system includes one or more container management components communicatively coupled to, and remotely located from, the one or more servers, and each container management component manages, at least in part, a lifecycle of one or more of the plurality of containers based at least in part on the information defined in the first database. At least one of the one or more container management components may be included in a gateway communicatively coupled to, and remotely located from, at least one sensor device physically coupled to the one or more containers, and the gateway may manage, at least in part, the lifecycle of the one or more containers by exchanging communications with the at least one sensor device. At least one of the one or more container management components may be included in a sensor device physically coupled to the one or more containers, and the sensor device may be in direct communication with at least one of the one or more servers. The defined information may include a plurality of defined states within a container lifecycle for the plurality of containers. Each of the plurality of containers may have a current defined state from among the plurality of defined states, and at least a first of the one or more container management components may determine one or more actions to be taken for at least a first of the plurality of containers based on the current defined state of the first container and one or detected properties of the first container. The one or more detected properties may include at least a fill level of contents of the at least first container. The one or more container management components may communicate information about one or more of the plurality of containers to the one or more servers as transaction blocks of a blockchain. One or more transactions corresponding to one or more of the plurality of containers may be stored as a smart contract in blockchain form. At least one sensor device may be physically coupled to a container and receive a remotely transmitted digitally signed software update, authenticate the software update and, if the software is authentic, update software on the at least one sensor device with the authenticated software. The system may further include one or more applications that maintain an inventory of the plurality of containers based at least in part on information transmitted by the sensor devices physically coupled to the containers. The system may further include one or more applications that automatically order more containers for an entity based at least in part on information transmitted by the sensor devices physically coupled to the containers.

In some embodiments of the system described herein, a method of managing a lifecycle of each of a plurality of containers remotely located from one or more servers having at least a first database defining information for managing the lifecycles of the plurality containers, each of the plurality of containers having a sensor device physically coupled thereto, is performed. The method includes using container management components communicatively coupled to, and remotely located from, the one or more servers, to manage, at least in part, a lifecycle of one or more of the plurality of containers based at least in part on the information defined in the first database. At least one of the one or more container management components may be included in a gateway communicatively coupled to, and remotely located from, at least one sensor device physically coupled to the one or more containers, and the gateway may manage, at least in part, the lifecycle of the one or more containers by exchanging communications with the at least one sensor device. At least one of the one or more container management components may be included in a sensor device physically coupled to the one or more containers, and the sensor device may be in direct communication with at least one of the one or more servers. The defined information may include a plurality of defined states within a container lifecycle for the plurality of containers. Each of the plurality of containers may have a current defined state from among the plurality of defined states, and the method may further include determining one or more actions to be taken for at least a first of the plurality of containers based on the current defined state of the first container and one or detected properties of the first container. The one or more detected properties include at least a fill level of contents of the at least first container. The method may further include communicating information about one or more of the plurality of containers to the one or more servers as transaction blocks of a blockchain. The method may further include storing one or more transactions corresponding to one or more of the plurality of containers as a smart contract in blockchain form. The method may further include receiving a remotely transmitted digitally signed software update, authenticating the software update, and, if the software is authentic, updating software on the at least one sensor device with the authenticated software. The method may further include maintaining an inventory of the plurality of containers based at least in part on information transmitted by the sensor devices physically coupled to the containers. The method may further include automatically ordering more containers for an entity based at least in part on information transmitted by the sensor devices physically coupled to the containers.

In some embodiments of the system described herein, one or more non-transitory computer-readable media are provided having software stored thereon for managing a lifecycle of each of a plurality of containers remotely located from one or more servers having at least a first database defining information for managing the lifecycles of the plurality containers, each of the plurality of containers having a sensor device physically coupled thereto. The software includes executable code that uses container management components communicatively coupled to, and remotely located from, the one or more servers, to manage, at least in part, a lifecycle of one or more of the plurality of containers based at least in part on the information defined in the first database. The software may be included in a gateway communicatively coupled to, and remotely located from, at least one sensor device physically coupled to the one or more containers, and the gateway may manage, at least in part, the lifecycle of the one or more containers by exchanging communications with the at least one sensor device. The software may be included in a sensor device physically coupled to the one or more containers, and the sensor device may be in direct communication with at least one of the one or more servers. The defined information may include a plurality of defined states within a container lifecycle for the plurality of containers. Each of the plurality of containers may have a current defined state from among the plurality of defined states, and the software may further include executable code that determines one or more actions to be taken for at least a first of the plurality of containers based on the current defined state of the first container and one or detected properties of the first container. The one or more detected properties include at least a fill level of contents of the at least first container. The software may further include executable code that communicates information about one or more of the plurality of containers to the one or more servers as transaction blocks of a blockchain. The software may further include executable code that stores one or more transactions corresponding to one or more of the plurality of containers as a smart contract in blockchain form. The software may further include executable code that receives a remotely transmitted digitally signed software update, executable code that authenticates the software update, and executable code that, if the software is authentic, updates software on the at least one sensor device with the authenticated software. The software may further include executable code that maintains an inventory of the plurality of containers based at least in part on information transmitted by the sensor devices physically coupled to the containers. The software may further include executable code that automatically orders more containers for an entity based at least in part on information transmitted by the sensor devices physically coupled to the containers.

BRIEF DESCRIPTION OF THE DRAWINGS

FIG. 5 is a diagram illustrating an example of a physical coupling a piezo sensor to a container according to embodiments of the system described herein;

FIG. 12 is a flowchart illustrating an example implementing a deep sleep mode for a sensor device, according to embodiments of the system described herein; and FIG. 13 is a flowchart illustrating an example of transitioning a sensor device to an idle state, according to embodiments of the system described herein.

DETAILED DESCRIPTION OF VARIOUS EMBODIMENTS

Figure 1:
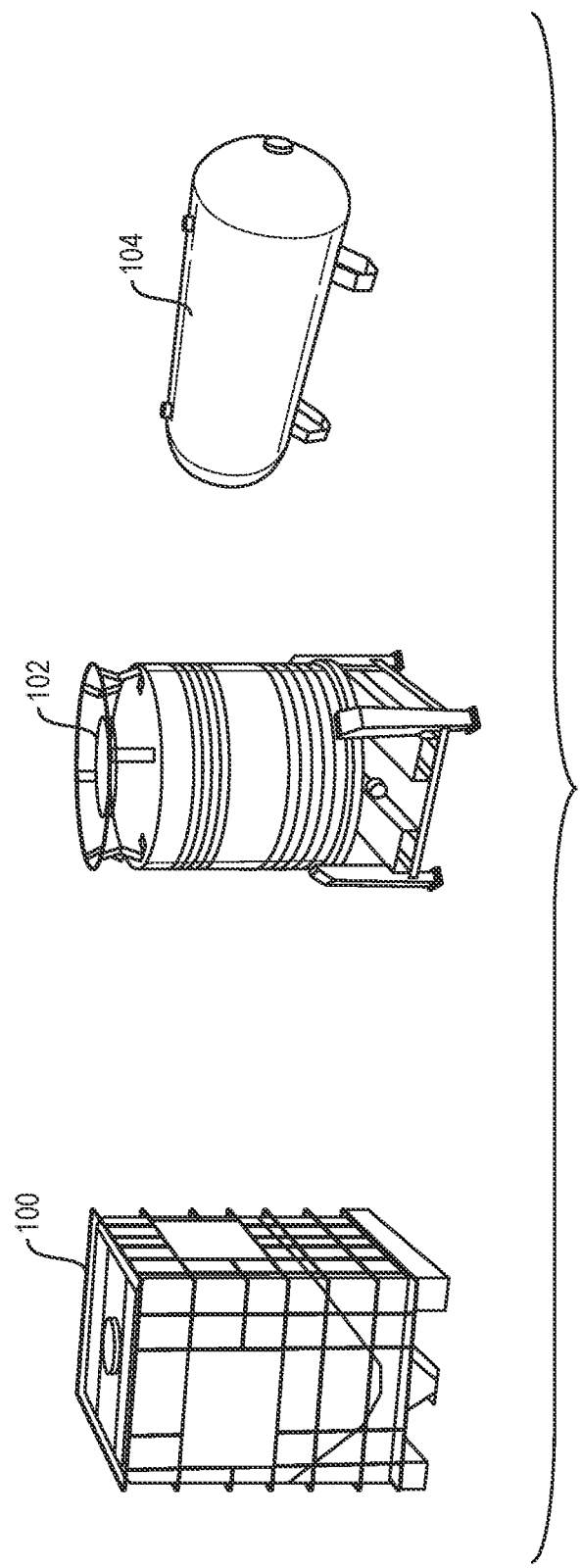
FIG. 1 illustrates examples of types of containers according to embodiments of the system described herein.

Described herein is a system, including devices and techniques, for remotely monitoring and managing the lifecycle of containers. Containers include IBCs, tanks and other types of containers, of various shapes, sizes and materials. A sensor device may be physically coupled to a container and include multiple types of sensors and/or sensor interfaces, including a fill-level sensor and/or interface thereto and one or more other sensors and/or other interfaces thereto for detecting other properties of the container, including, but not limited to: temperature, humidity, pressure, structural condition and location. The sensor device may be configured with intelligence to analyze the information received from multiple sensors, determine actions to be taken, and control such actions. In this sense, the sensor device may be considered a smart or intelligent sensor device.

The intelligence of the sensor device may be provided in one more components of the sensor device, including but not limited to an intelligent processing unit (IPU) and ultrasonic sensor controller (USC), which may be integrated together, for example, on a printed circuit board (PCB). The sensor device may be housed within a housing that can be readily attached (e.g., mounted) and detached from a container, which may be designed to be physically robust for outdoor use. In some embodiments, for example, when multiple containers are installed as part of a system, e.g., at an industrial facility, a single IPU may be connected to multiple USCs, each USC physically coupled to a respective container.

In some embodiments, a container may be internally lined with one or more liners having one or more layers. In such embodiments, the container may be physically coupled to the one or more liners, for example, using ultrasonic welding, and the sensor device may be configured to factor the one or more liners when determining fill levels and other properties of the container.

A sensor device as described herein may be part of a container management network, which may be considered a kind of internet-of-things (IoT) system. The container management network may include one or more gateway devices communicatively coupled to the smart sensor devices and to one or more servers of a cloud layer of the container management network. The sensor device may include one or more network interfaces for communicating with the container management network, for example, via gateways, and may be configured with technology for communicating with a plurality of types of networks, including, for example, cellular/mobile (LTE, 3G, 4G 5G, GSM, CDMA, etc.), Wi-Fi, GPS, ISM, and Ultra-Wideband (UWB) technology, and/or any other appropriate network technology. The sensor device may be configured to use the networking technology to determine a location and a change of location of a container, and also to communicate status information of the container to the container management network and receive information from the container management network. The status information may include one or more properties detected or determined by the device and other information, and the information received by the sensor device may include instructions, updated container information based on analysis performed by a gateway, server or other network components, technology updates and other information. The servers, gateways and sensor devices may be configured to communicate information with each other in an efficient manner, according to predefined schedules, and may use blockchain technology to communicate and store such information in transaction blocks. Blockchain technology also may be used to communicate and store transactions between parties (e.g., container producers, OEMs, customers, transporters) concerning containers, for example, as smart contracts.

In some embodiments, a sensor device may be configured to communicate directly to one or more servers of the cloud layer without using a gateway as an intermediary. In such embodiments, the sensor device may be configured with any of the capabilities described herein in relation to gateways and may include any of the components of a gateway described herein.

The cloud layer of the container management network may include, as embodied on one or more servers, services and applications for remotely monitoring and managing containers, and these services and applications, or portions thereof, may be implemented on gateways and sensor devices as well. Information concerning containers, contents of the containers and lifecycle management of the containers may be stored in the cloud layer on one or more servers and used by the services and applications. Lifecycle management information may include one or more defined states corresponding to phases in the lifecycle of a container, and may include any of: an idle state; a container production state; a preparation state; a filling production state; a transport-to-customer state; a monitor-at-customer state; a transport-back-to-OEM state; an EOL state; a transport-to-container-producer state; other states; or any suitable combination of the foregoing, each of which is described in more detail below.

The phases of a container lifecycle represented by the defined states described herein may be considered to correspond to aspects of a Kanban manufacturing management system. Thus, embodiments of the system described herein may be used to implement what may be considered a smart Kanban process.

In the idle state, defined in more detail below, components of the sensor device may be powered down to conserve power. In a deep sleep mode of operation, the sensor device may be awakened from time-to-time, e.g., periodically, at predefined times of day, at predefined days of week, month or year, in response to instruction, and/or in response to detected movement of the sensor (and by inference the container). While awake, i.e., in an active state, the sensor device may power-on components, detect properties, analyze the properties and other information, store status information, transmit the status information to a gateway if possible, and then return to the idle state. These steps may be repeated until it is decided to exit the deep sleep mode, for example, in response to a change of defined state. The time during which the sensor device is awake during deep sleep mode may be configured to be short compared to the time during which it is idle during deep sleep mode, to thereby maximize power conservation, and possibly extend the life of the sensor device components.

Gateways and sensor devices of the container management network may be configured with knowledge of these defined states of a container lifecycle. The current defined state and changes to the defined state may be included in the information communicated between sensor devices, gateways and servers, and used in analysis performed and decisions made by any of these components. That is, the intelligence with which the sensor device is configured to determine actions to be taken and to control such actions may include considering the current defined state of a container along with information received from sensors. For given information detected from one or more sensors, the action determined may differ for different defined states. The sensor device also may include a movement sensor to detect movement of the sensor, for example, acceleration of the sensor, in multiple dimensions, and may include a timer component. The movement sensor and timer component may be configured to wake-up the sensor device in response to movement or a particular time or elapsed time, respectively, as described below in more detail.

The system described herein, which will now be described in more detail in relation to the drawings, provides a holistic solution for remotely managing the lifecycle of containers in a more flexible, reliable, efficient and comprehensive manner than previously existed.

FIG. 1 illustrates examples of types of containers 100, 102 and 104, according to embodiments of the system described herein. The container 100 may be a type of IBC container made primarily from plastic, and the container 102 may be an IBC made primarily of a metal or metal alloy, for example aluminum or stainless steel, for example, of the type used for transportation of food and beverages. The container 104 is an example of a tank, for example, a tank for storing gas or liquids (e.g., beer or other beverages), which may be installed at an industrial facility or other location. Other embodiments of containers, and of various sizes, for example, variations of the containers 100, 102 and 104, are possible and are intended to fall within the scope of the invention. Further, while various embodiments of the system described herein are described primarily in relation to IBCs, and in some cases installed tanks, it should be appreciated that the invention is not so limited, and other types of containers that are used for transporting or storing liquids, solids and other goods, may be used.

Figure 2:
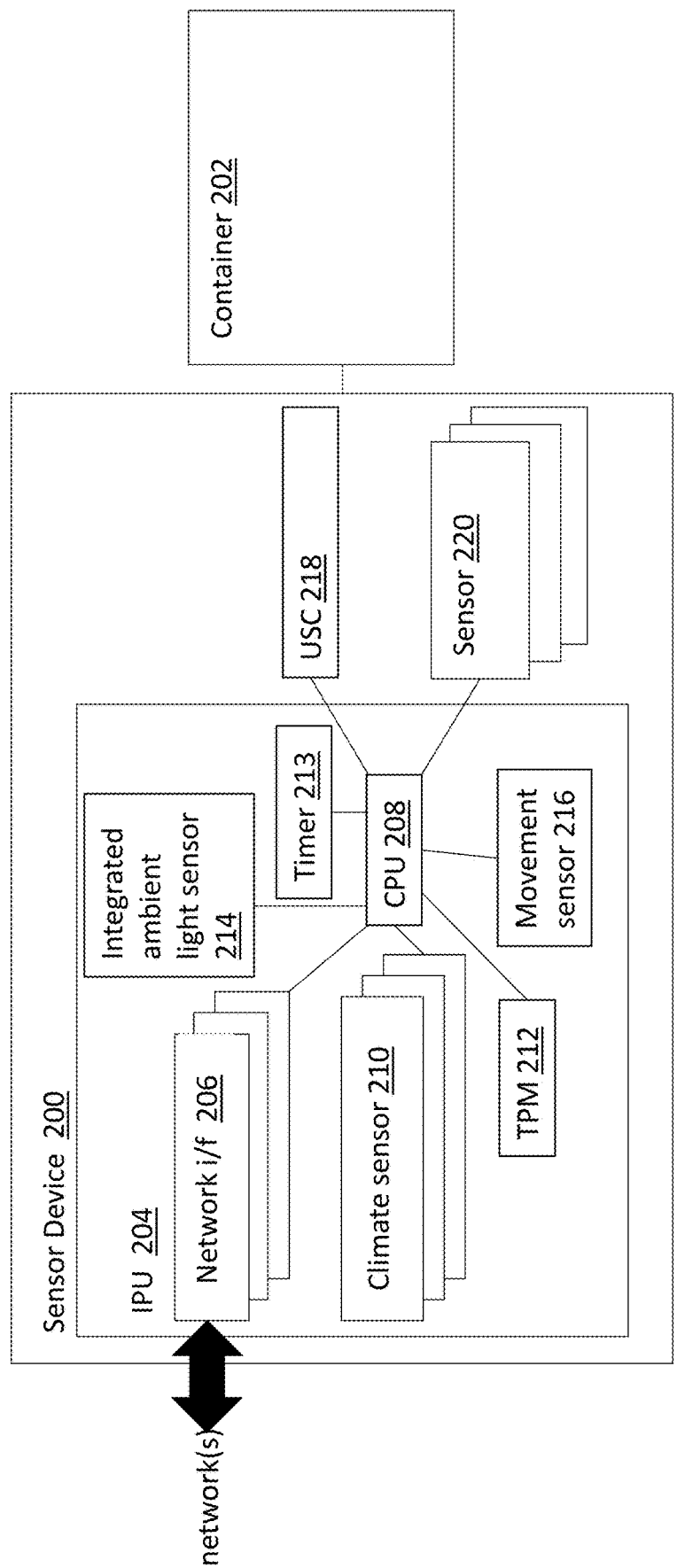
FIG. 2 is a block diagram illustrating an example of a sensor device coupled to a container according to embodiments of the system described herein.

FIG. 2 is a block diagram illustrating an example of a sensor device 200 coupled to a container 202 according to embodiments of the system described herein. Other embodiments of sensor devices, for example, variations of the sensor device 200, are possible and are intended to fall within the scope of the invention. The container 202 may be any type of container, for example any of the containers 100, 102 and 104 described above in relation to FIG. 1. The sensor device 200 may include any of: an IPU 204, a USC 218, one or more sensors 220, other components or any suitable combination of the foregoing.

IPU 204 may include any of: a CPU 208, one or more network interfaces (i/fs) 206, an integrated ambient light sensor 214, a movement sensor 216, one or more climate sensors 210, a TPM 212 and a timer component 213. The CPU 208 may be an ARM CPU or other type of CPU, and may be configured with one or more of the following: required processing capabilities and interfaces for the other components of IPU 204 described herein, an ability to be interrupted by the timer component 213 and by the movement sensor 216, random access memory, and nonvolatile memory (e.g., FLASH) for storage. In some embodiments, the CPU 208 may be implemented using an STM32L4 96 VG CPU or a similar CPU made available by STMicroelectronics. The timer component 213 may provide a clock for the IPU 204, and to the CPU 208 specifically. The timer component 213 may be configured to provide the clock at any of a variety of frequencies, for example, at 32 KHz or lower. The frequency of the clock may be selected to balance a variety of factors, including, for example, fiscal cost, resource consumption (including power consumption) and highest desired frequency of operation.

The one or more network interfaces 206 may include a plurality of types of network interfaces, each interface configured to implement a particular technology to enable communications with one or more types of networks. For example, the one or more network interfaces 206 may include one or more cellular communication interfaces enabling communications with cellular networks, and may be configured with technologies such as, for example, Long-term Evolution (LTE) and derivatives thereof like LTE narrowband (5G) and LTE FDD/TDD (4G), HSPA (UMTS, 3G), EDGE/GSM (2G) or CDMA technologies. Cellular communications may be used as one possible form of communication to enable a sensor device to communicate with one or more other devices of a container management network, such as systems described elsewhere herein, to perform any of a variety of functions. Such functions may include detection of geographic location of a container (i.e., to which a sensor device is affixed or otherwise coupled), including detecting a change in location from one cell of a cellular network to another cell, and a relative location of a container within a cell, for example, a radial distance from the cell phone base station. The one or more cellular communication interfaces may be, include, or be part of a cellular modem.

The one or more network interfaces 206 may be configured to implement GPS technology, which in some embodiments may be integrated with cellular technology as part of a cellular modem. The network interfaces 206 also may be configured to implement UWB technology if accuracy of indoor location on the order of centimeters is desired, for example using one or more MYNXG® d3 modems available from MyOmega Systems GmbH having offices in Nuremberg, Germany, (hereinafter "MyOmega"). Network interfaces 206 further may be configured to implement Wi-Fi technology, e.g., in accordance with one or more 802.11 standards, which may save communication cost. This cost saving may be more desirable for larger fleets of IBCs, for example. The Wi-Fi technology may be used to connect with hotspots at various locations and during various states of a container lifecycle described in more detail elsewhere herein, and may serve as an option for establishing a communication path within a container management network, for example, as an alternative, or in addition to a cellular communication path.

The one or more network interfaces 206 may be configured to implement Industrial, Scientific and Medical (ISM) band technology, e.g., 6LoWPAN, ZigBee, Lora and or Sigfox, to establish Wide Area Low Power links, having a range of, for example, 3000 meters, or perhaps more. In some embodiments, an ISM technology may be employed with 802.15.4 PHY, 6 LoWPAN Layer 2 and MAC and CoAP protocol via ISM band.

The movement sensor 216 (e.g., an accelerometer) may be configured to detect and measure three-dimensional (e.g., relative to three axes) acceleration movement, and may use an optional gyroscope or artificial horizon, to detect the movement of the container 202. That is, the movement sensor 216 may be configured to detect relative abrupt movement, e.g., as a result of a sudden acceleration, in contrast to a more general change in geographic location. Such a movement may occur, e.g., as a result of a sudden stop, an accident, falling from a shelf, tipping over, being manually jostled, a hole in a road, a deformation of a railroad rail, wind turbulence impacting an airplane, stormy seas, etc. The movement sensor 216 may be used in combination with interrupt functionality of the CPU 208 to implement a deep sleep mode of operation, as is described in more detail elsewhere herein.

The one or more climate sensors 210 may be configured to measure any of a variety or climate conditions of the sensor device 200, e.g., inside a housing of the sensor device 200 or a housing containing one or more components thereof, such as housings described elsewhere herein. Such climate conditions may include any of: temperature, air humidity, air pressure, other climate conditions or any suitable combination thereof. While climate conditions may be measured inside a housing, in some embodiments the sensor device may include a pressure compensation membrane (e.g., a climate pressure equalization gasket), and measurement cycles may be ultra-short such that the measured climate conditions are valid for an environment surrounding the sensor device as well. While the one or more climate sensors 210 are illustrated as being part of the IPU 204, one or more additional climate sensors may be external to the IPU 204, within the sensor device 200 (e.g., as one or more sensors 220) or external thereto. Climate sensors located external to the IPU 204 may be linked through one or more M12.8 connector-based digital and/or analog interfaces, and may measure any of a variety of climate conditions, including but not limited to: temperature, humidity and pressure or other climate conditions of a container, the contents thereof (e.g., liquid, solid, air) and/or ambient air external to the container.

The integrated ambient light sensor 214 may serve to ensure the integrity of the housing and/or electronics, including providing mechanical dust and water detection. The sensor may enable detection of evidence of tampering and potential damage, and thus provide damage control to protect electronics of the sensor device 200.

The Trusted Platform Module (TPM) 212 may be used to encrypt data and to protect the integrity of the IPU 204. The TPM 212 may be used for any of a variety of functions such as, for example, creation of data for, and storage of credentials and secrets to secure, communication with one or more networks (e.g., any of the networks described herein); creation of TPM objects, which are special encrypted data stored in the nonvolatile memory outside the TPM, that can only be decrypted through the TPM; creation of data to be communicated and stored as part of transaction records (e.g., blockchain records) or registers, signing of files to secure the integrity and authenticity of services, e.g., services described herein; enablement of functions like Over-the-Air (OtA) update of firmware, software and parameters of the sensor device 200; other functions; and any suitable combination of the foregoing.

The IPU 204 may include digital and/or analog interfaces, which may utilize an M12.8 connector to communicate with USC 202 and/or the one or more sensors 220. The one or more sensors 220 may include any of the following: pressure sensors that are used to detect pressure (e.g., air pressure) within the container 202; difference pressure sensors to identify a pressure in the container above a liquid contained therein; temperature array sensors to identify temperature profiles (e.g., the Melexis MLX 90621 Infrared sensor array made available from Melexis of Belgium, which provides 16×4 pixels); strain gauge sensors to identify forces measured on ground contacts, which may be used to detect fill levels of solid bulk materials or to detect weight of a container, other sensors, or any suitable combination of the foregoing. The temperature sensor on a surface of a container may be detected and used as part of estimating an approximate fill level of the container. The IPU 204 may be implemented using one or more software components, including the operating system, of a MYNXG® TracoSense® sensor platform made available by MyOmega, and the sensor device 200 may be implemented as part of, or include a MYNXG® TracoSense® IBC™ product made available from MyOmega.

Although not illustrated in FIG. 2, sensor device 200 also may include one or more mobile phone vibrators or the like and microphones, which may be used, for example, for one or more of the following purposes: detection of damage to the container 202; detection of fill levels of the container 204; and, in combination with logic (e.g., hardware, firmware or software) within the IPU 204, to determine a system health of the container by analyzing resonances and frequencies of impact sound on the container 202 using, for example, proprietary Detailed Sampling Mode (DSM) techniques available from MyOmega or any other appropriate technique, including conventional techniques for analyzing resonances and frequencies of impact sound. For example, a microphone may be connected via digital/analog M12.8 connectors to the sensor device 200 and/or integrated within the sensor device 200 (e.g., within the IPU 204). Sound waves may be caused by acoustic stimulation of the container, and DSM techniques may be employed to sample and analyze the sound waves.

Although not illustrated in FIG. 2, the sensor device 200 also may include one or more cameras, which may be used to monitor and record the fill levels in the container 202, where such fill-level information may be used by image-processing logic, e.g., within the IPU 204 and/or a gateway, server or other elements of a container management network described herein to control the fill level of the container 202. The sensor device 200 may include, within the IPU 204 or otherwise, one or more batteries or accumulators, for example, a Lithium ion battery, and/or interfaces thereto. The sensor device 200 also may include one or more interfaces that enable the battery or accumulator to be charged, and/other interfaces, for example, one or more interfaces for display devices, e.g., an e-Paper interface.

The sensor device 200, or portions thereof, including the IPU 204 and the USC 218, may be implemented in hardware, firmware, software or a combination thereof, for example, on a PCB. In such embodiments, the PCB may be affixed to one or more M12.8 connectors, for example, a male and female M12.8 connector. A battery or accumulator of the sensor device 200 may be charged via an M12.8 connector, and external components may communicate with components of the sensor device 200 via one or more M12.8 connectors as described elsewhere herein. The sensor device 200 may include one or more antennas corresponding to the one or more communication technologies that may be included in the sensor device 200 as described elsewhere herein. Each antenna may be integrated, if suitable, within the PCB in embodiments including a PCB, for example, in the IPU 204, or may be physically connected to the PCB and/or a housing thereof. For example, one or more antennas may be implemented as an integrated foil antenna, glued to the PCB or housing of the sensor device 200.

The USC 218 may be used to monitor and control a fill-level sensor, for example, a piezo sensor as described in more detail elsewhere herein. The USC 218 may be implemented in hardware, firmware, software or a combination thereof, for example, on a PCB, and, in some embodiments, may be physically integrated on a PCB or other hardware configuration with the IPU 204. One or more components of IPU 204 may be implemented, at least in part, as part of USC 218, and vice versa. It should be appreciated that technology other than ultrasonic signals may be used in addition, or as an alternative, to ultrasonic signals to determine a fill level of the container 202, in which case the sensor device 200 may include another type of controller in addition, or as an alternative, to the ultrasonic sensor 218, according to some embodiments of the system described herein.

Figure 3:
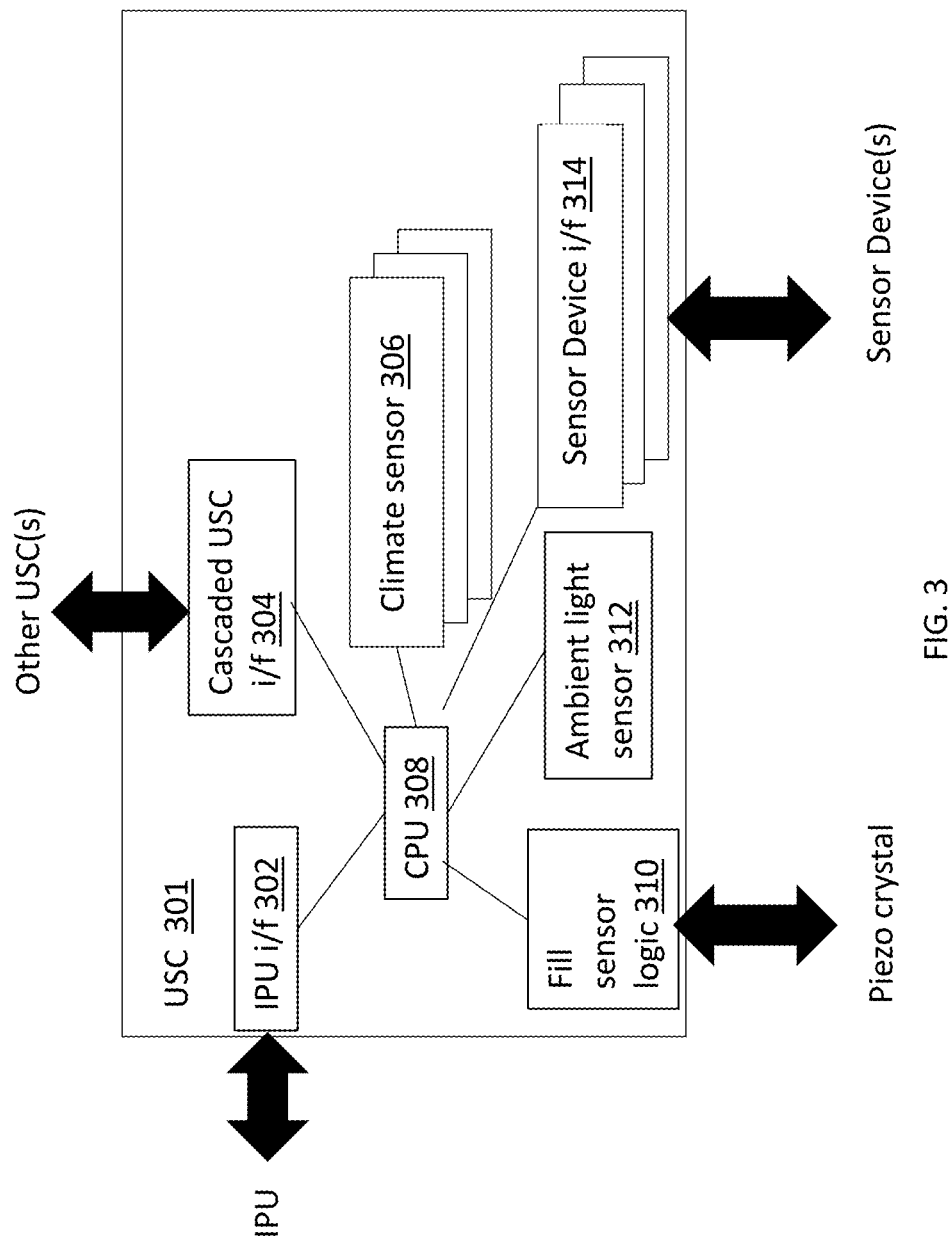
FIG. 3 is a block diagram illustrating an example of an ultrasonic sensor controller (USC) according to embodiments of the system described herein.

FIG. 3 is a block diagram illustrating an example of a USC 301 according to embodiments of the system described herein. The USC 218 may be implemented as the USC 301. Other embodiments of a USC, for example, variations of the USC 301, are possible and are intended to fall within the scope of the invention. The USC 301 may be implemented in hardware, firmware, software of a combination thereof, for example, on a PCB. The USC 301 may include any of: IPU interface 302; cascaded USC interface 304; one or more climate sensors 306; CPU 308; fill sensor logic 310; ambient light sensor 312; one or more external sensor interfaces 314; other components; or any suitable combination of the foregoing.

The IPU interface 302 may be connected to an IPU, for example, the IPU 204, via a wired or wireless connection, and exchange fill-level information and other information with the IPU. The cascaded USC interface 304 may be connected to one or more other cascaded USCs, for example, in embodiments in which multiple USCs are cascaded and coupled to an IPU, e.g., as described elsewhere herein. The one or more climate sensors 306 may be any of a variety of climate sensors, for example, any of the variety of climate sensors described elsewhere herein, for example, the sensors described above in relation to FIG. 2, and may measure any of a variety of climate conditions, including but not limited to: temperature, humidity and pressure or other climate conditions of a container, the contents thereof (e.g., liquid, solid, air) and/or ambient air external to the container. The one or more external sensor interfaces 314 may be configured to interface with any of the variety of types of sensors located external to the USC 301, which may be any of the variety of types of sensors described elsewhere herein, for example, the sensors described above in relation to FIG. 2. The CPU 308 may be any of a variety of suitable CPUs, and may control the USC 301.

The fill sensor logic 310 may be configured to interface with a fill sensor, and filter and process information (e.g., embodied within signals) received from one or more fill sensors. The fill sensor logic 310 may be connected to one or more fill sensors via an M12.8 connector. The one or more fill sensors may be any of a variety of sensors for use in detecting liquid, bulk solid or particle solid fill levels in a container, for example, a sensor that includes a piezo crystal. For example, when the container contains liquid, the one or more fill sensors may provide raw liquid-fill information, including information resulting from a series of reflections, for example, as described elsewhere herein. The fill sensor logic 310 may filter and process the raw information, including interpreting it based on the detected time of flight of each reflected signal, and produces information indicative of the fill level of one or more fluids within a container.

The ambient light sensor 312 may be configured to detect the integrity of the mechanics of the USC 301 and detect evidence of tampering with the USC 301. Information received, filtered or processed by the USC 301 may be passed to an IPU, e.g., via the IPU interface 302, and passed onto other components of a container management system, and further analyzed and processed, as described in more detail elsewhere herein.

Figure 4:
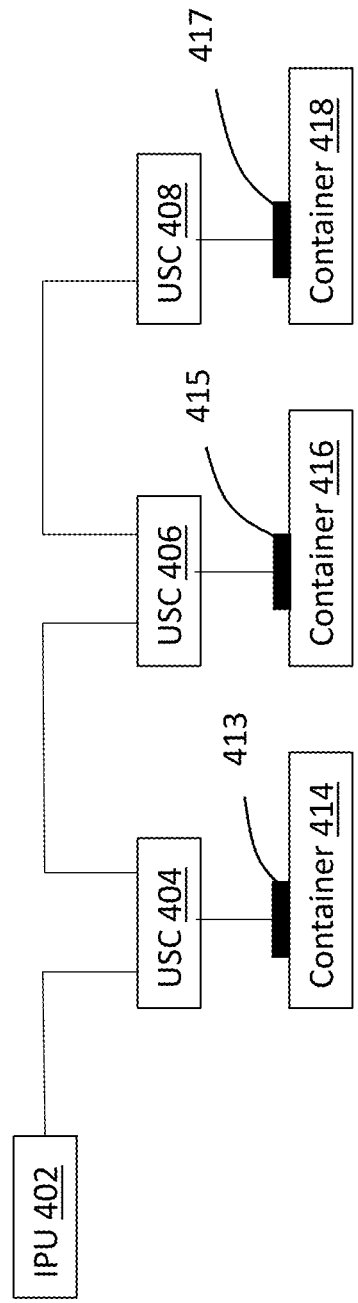
FIG. 4 is a block diagram illustrating an example of a coupling of an intelligent processing unit (IPU) to a plurality of containers according to embodiments of the system described herein.

FIG. 4 is a block diagram illustrating an example of a coupling of an IPU 402 to a plurality of containers 414, 416 and 418 according to embodiments of the system described herein. Other embodiments of such a configuration, for example, variations of the configuration depicted in FIG. 4, are possible and are intended to fall within the scope of the invention. The IPU 402 may be coupled to the plurality of containers 414, 416 and 418 via a plurality of USCs 404, 406 and 408, respectively, and fill sensors 413, 415 and 417 (e.g., piezo crystals), respectively. It should be appreciated that, while only three USCs, fill sensors and containers are shown in FIG. 4, the invention is not so limited, as any number of such components may be used, taking into consideration physical, fiscal and logical feasibility. In such a configuration, the USCs may be considered to be arranged in a cascaded or concatenated fashion. Such a configuration may be desired, for example, for managing a group (e.g., fleet) of tanks, for example tanks of beer, installed at an industrial facility. In such a configuration, a single IPU (e.g., the IPU 402) may control multiple USCs (e.g., USCs 404, 406 and 408). Each USC may be configured to measure fill levels and any other container climate conditions (e.g., pressure, temperature) described herein.

FIG. 5 is a diagram illustrating an example of a physical coupling of a piezo sensor 502 to a container (e.g., IBC or tank) according to embodiments of the system described herein. Other embodiments of such a configuration, for example, variations of the configuration depicted in FIG. 5, are possible and are intended to fall within the scope of the invention. The piezo sensor 502 may be affixed to a surface of a wall 500 of a container by a substrate 504. In some embodiments, for example, if the container is steel or another metal alloy, the substrate 504 may be a type of glue. In other embodiments, for example, if the container is made of a type of plastic or polymer, the substrate 504 may be an overmould, for example, and may be made of a same or similar material as the wall of the container. The piezo sensor 502 may be coupled to a USC 508 by one or more physical connections 506, for example, in such a way that enables removal of the USC 508 from the connections 506 to allow independent access to the USC 508 and to the substrate-sensor-connector assembly for ease of service and maintenance.

Figure 6B:
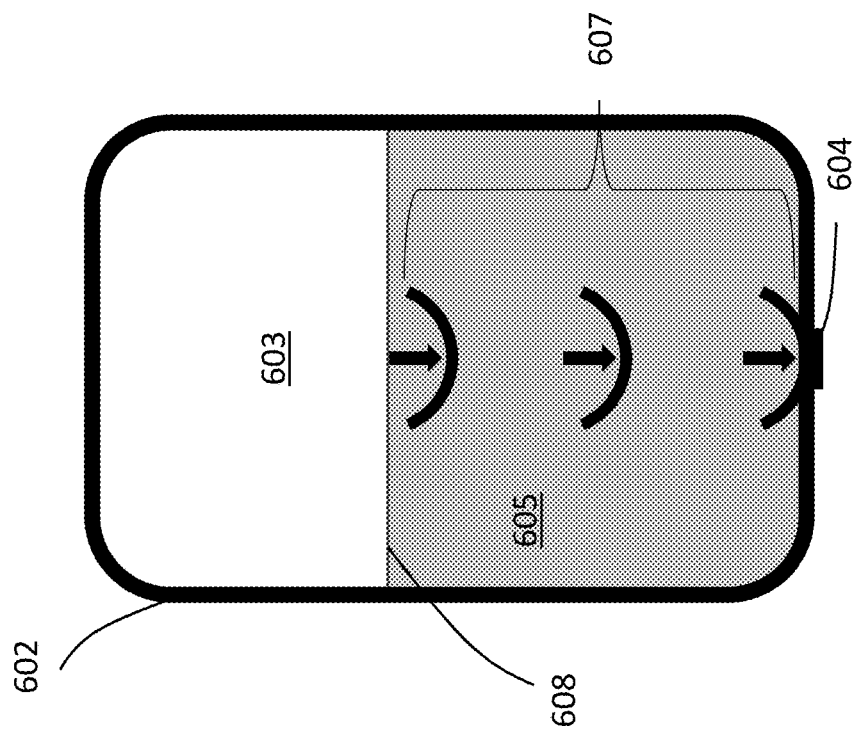
FIGS. 6A and 6B illustrate an example of using ultrasonic waves to determine the fill level of contents in a container according to embodiments of the system described herein.
Figure 6A:
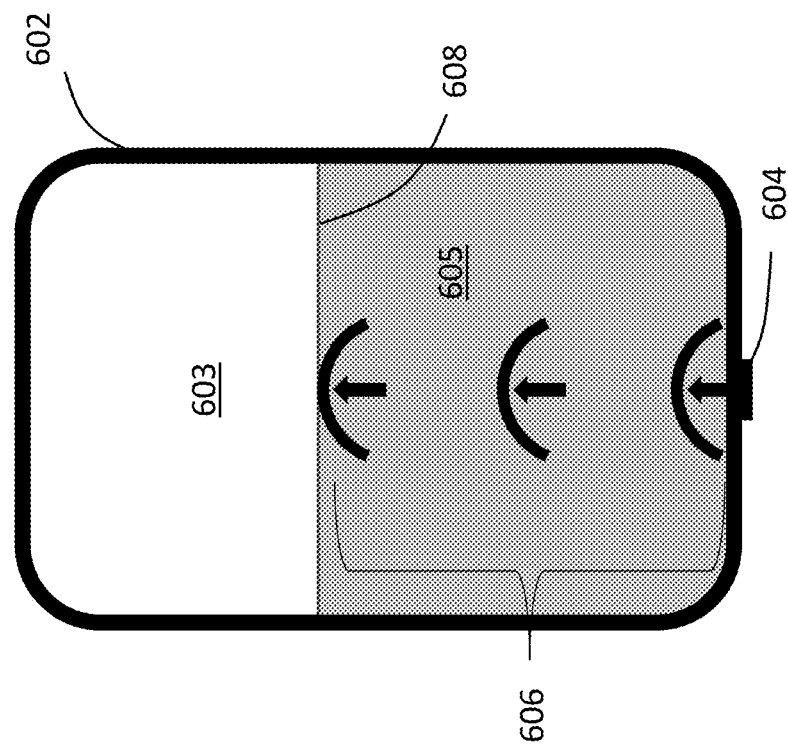
Figure 6D:
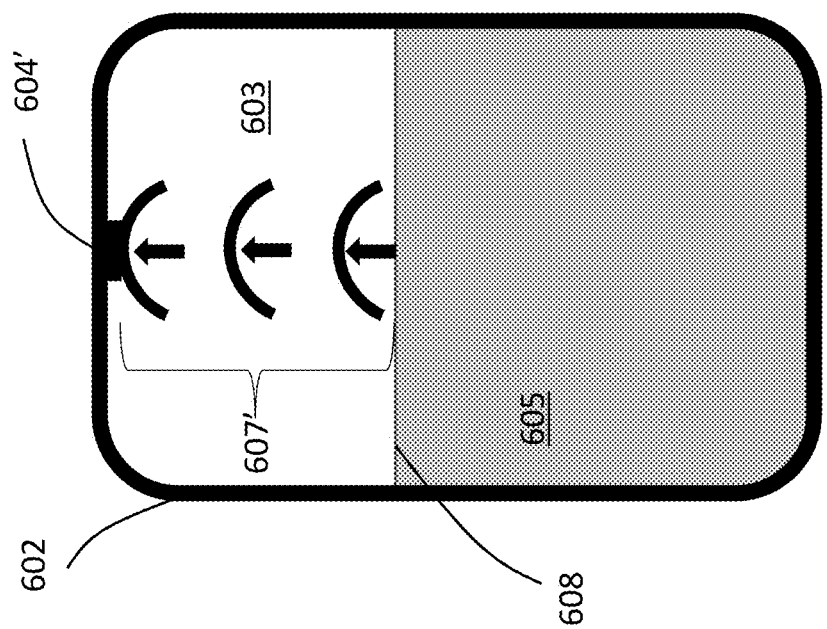
FIGS. 6C and 6D illustrate another example of using ultrasonic waves to determine the fill level of contents in a container according to embodiments of the system described herein.
Figure 6C:
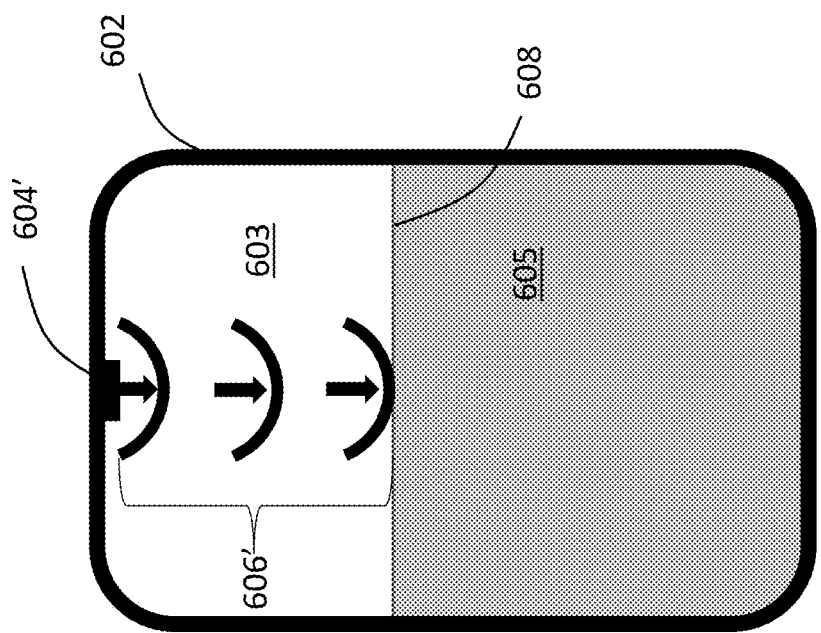

FIGS. 6A and 6B illustrate an example of using ultrasonic waves to determine the fill level of contents in a container 602. Other embodiments of such a technique, for example, variations of the technique depicted in FIGS. 6A and 6B, or the technique illustrated in FIGS. 6C and 6D, are possible and are intended to fall within the scope of the invention. Short ultrasonic signals 606 may be emitted by a piezo crystal within piezo sensor 604, and each surface within the container 602 may reflect the signals 606. For example, FIG. 6B illustrates a reflected signal 607 reflected from the surface 608 of the contents (e.g., liquid) 605 under the air 603. While FIGS. 6A and 6B illustrate the signals 606 reaching the surface 608 and producing reflected signal 607, it should be appreciated that at least a portion of the signal 606 may continue beyond the surface 608 and, continuing through the air 603, at least a portion thereof may reflect off of a top interior surface of the container, producing other reflected signals. Further, the container 602 may include multiple layers of liquids or other materials including solid materials, for example, as described elsewhere herein in relation to orange concentrate, and each surface between materials may produce reflected signals. The reflected signals produced from one or more surfaces within the container 602 are captured by the piezo sensor 604, and then filtered and/or processed and measured to determine the time of flight of each signal, for example, by a USC or other component(s) as described elsewhere herein, e.g., using known or later-developed techniques. The location of the surface 608 and thus the fill level of the container 602 can be determined from the time of flight of the signals, the known dimensions of the container 602 and other factors, for example, the velocity of the signals in each material in the container 602, and taking into consideration the interference between signals 606 and any reflected signals. The piezo sensor 604 may be affixed to the container 602, for example, as described in relation to relation to FIG. 5. In some embodiments, the piezo sensor 604 may be located within (e.g., mounted to an interior surface of) the container 602. Another type of sensor other than a piezo sensor may be used.

FIGS. 6C and 6D illustrate an example of using ultrasonic waves to determine the fill level of content within a container 602. By disposing the piezo sensor 604' (or piezo sensor 604 in FIGS. 6A and 6B) in the interior as opposed to the exterior of the container 602, the wall(s) of the container do not interfere with the transmitted signals (606, 606') and reflected signals (607, 607'), resulting in stronger signals to penetrate denser materials like solids. Further, by having the piezo sensor 604' at the top of the container, the transmitted and reflected signals (606' and 607') need only travel through air (or protective gas atmospheres) 607' before reaching a surface of the contents 605, as opposed to the contents themselves. Other embodiments of such a technique, for example, variations of the technique depicted in FIGS. 6C and 6D, or the technique illustrated in FIGS. 6A and 6B, are possible and are intended to fall within the scope of the invention. In the embodiment depicted in FIGS. 6C and 6D, a piezo sensor 604' may be disposed at a top of the container 602 instead of at the bottom as in the embodiment of FIGS. 6A and 6B, and may be mounted inside the container 602. In other embodiments, the piezo sensor 604' may be located externally to the container, and another type of sensor other than a piezo sensor may be used. Short ultrasonic signals 606' may be emitted by a piezo crystal within the piezo sensor 604', and each surface within the container 602 may reflect the signals 606'. For example, FIG. 6D illustrates a reflected signal 607' reflected from the surface 608 of the contents 605 under the air 603. While FIGS. 6C and 6D illustrate the signals 606' reaching the surface 608 and producing reflected signal 607', it should be appreciated that at least a portion of the signal 606' may continue beyond the surface 608 and, continuing through the contents 605, at least a portion thereof may reflect off of a bottom interior surface of the container, producing other reflected signals. Further, the container 602 may include multiple layers of liquids or other materials including solid materials, for example, as described elsewhere herein in relation to orange concentrate, and each surface between materials may produce reflected signals. The reflected signals produced from one or more surfaces within the container 602 may be captured by the piezo sensor 604', and then filtered and/or processed and measured as described in relation to FIGS. 6A and 6B.

Figure 7B:
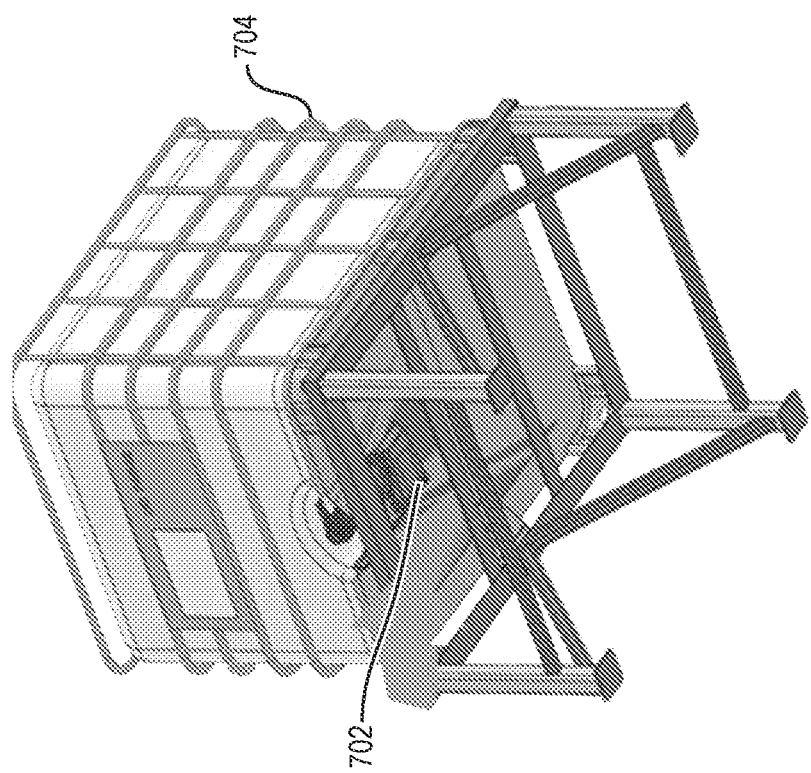
FIGS. 7A and 7B illustrate an example of a sensor device housing physically coupled to a container according to embodiments of the system described herein.
Figure 7A:
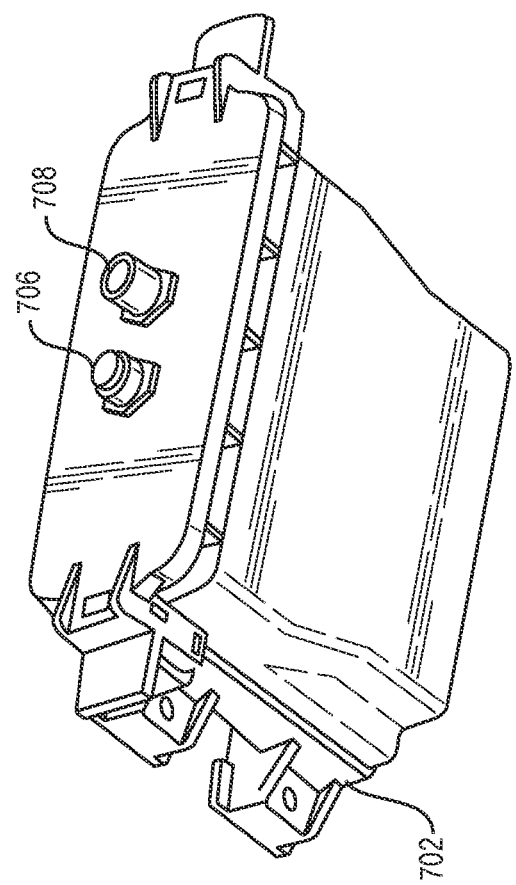

In some embodiments, a sensor device (e.g., the sensor device 200), or one or more components thereof (e.g., the IPU 204, one or more USCs 218 and one or more sensors 220) may be housed in a housing. FIGS. 7A and 7B illustrate an example of a sensor device housing 702, with a sensor device or one or more components thereof housed within, physically coupled to a container 704 (e.g., a plastic IBC) according to embodiments of the system described herein. As illustrated in FIG. 7B, the sensor device housing 702 may be mounted to the container 704 by a locking mechanism. The housing 702 may include one or more M12.8 connectors, for example, a female connector 706 and a male connector 708. Such a housing 702 may be particularly desirable for containers (e.g., the container 704) that are to be located outdoors, and may be implemented using any of a variety of housings available today, for example, an ECS outdoor housing made available from Phoenix Contact, headquartered in Blomberg, Germany.

The sensor device housed within housing 702 may include an IPU (e.g., the IPU 204) and a USC (e.g., the USC 301) integrated on a same PCB, which may save space and cost. The housing 702 may provide any of a plurality of functions and benefits such as, for example, fast assembly/disassembly of a sensor device from a container with a click-and-lock mechanism. A piezo sensor and/or other sensors (e.g., other sensors described herein) may be connected to the one or more connectors 706 and 708. For example, in some embodiments, a piezo sensor may be connected to the female connector 706 and one or more other sensors may be connected to the male connector 708. The sensor housing 702 may enable charging of one or more batteries or accumulators of the housed sensor device via the one or more M12.8 connectors 706 and 708. The housing 702 may be physically connected (e.g., by glue) to one or more antennas that enable wireless communications between components of the housed sensor device and external components, for example, as described in relation to FIG. 2.

It may be desirable to line an IBC, tanks or other type of container internally with one or more liners, for example, for hygienic and/or cleaning reasons, each liner containing one or more layers, where each layer may provide a certain function and/or redundancy of function of another layer. Thus, in some embodiments of the system described herein, a container may be configured to be coupled with one or more liners having one or more layers. The container may be coupled to the one or more liners, and the sensor device may be configured to detect a fill level (as well as other properties described herein) of a container so lined.

Figure 8:
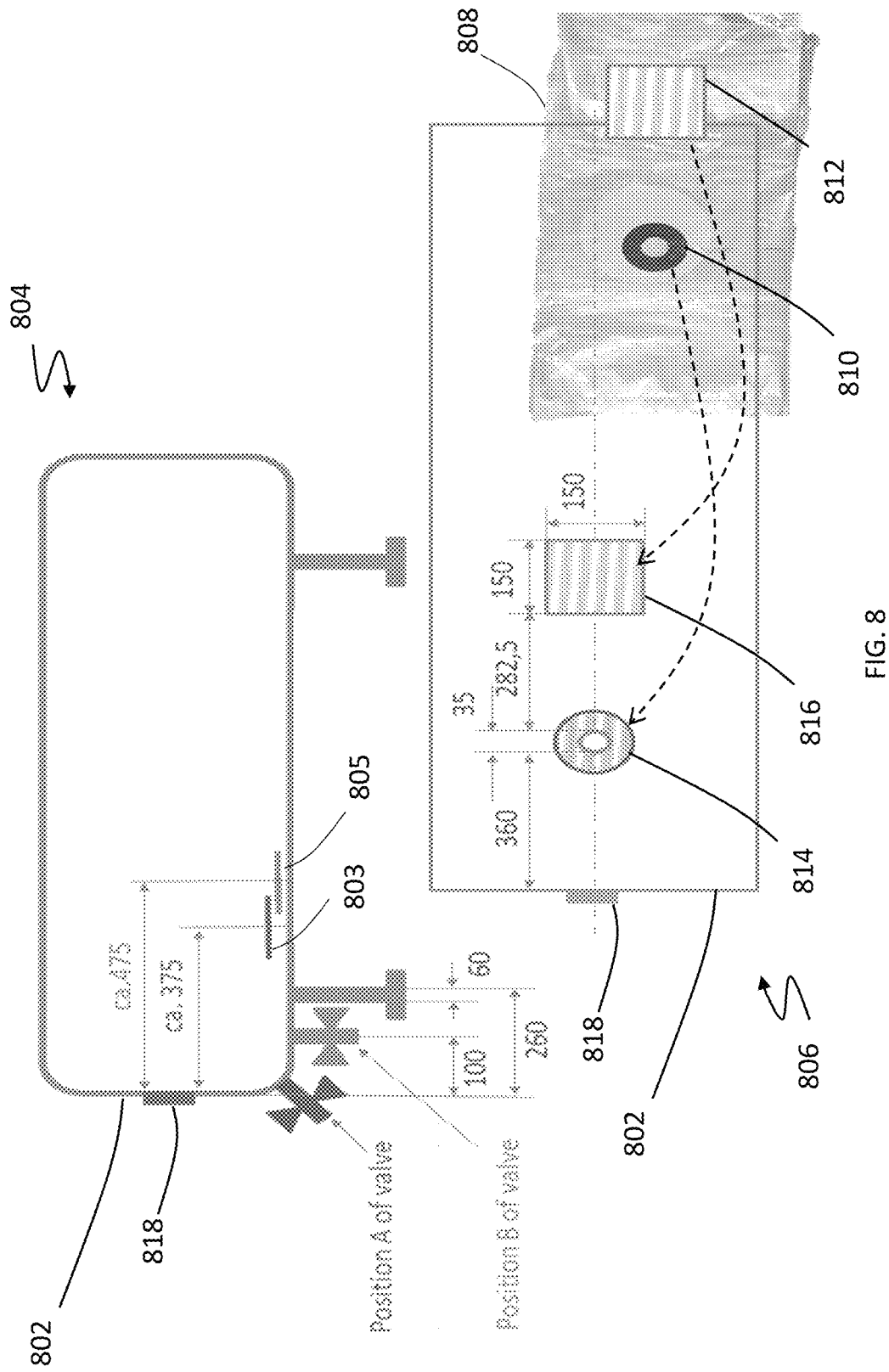
FIG. 8 is a diagram illustrating an example of coupling a tank to a liner for liquid fill level detection, according to embodiments of the system described herein.

FIG. 8 is a diagram illustrating an example of configuring a tank liner for fill-level detection, according to embodiments of the system described herein. Other embodiments of configuring a tank liner for liquid fill level detection, for example, variations of the configuration illustrated in FIG. 8, are possible and are intended to fall within the scope of the invention. FIG. 8 illustrates a side view 804 of a liquid tank 802 (e.g., a beer tank) and a top plan view 806 of the liquid tank 802. In some embodiments, the elements illustrated in FIG. 8 may have the numeric dimensions illustrated in millimeters. Other dimensions are possible and within the scope of the invention. Depending on a position of an emptying valve, for example, "Position A of valve" or "Position B of valve" in FIG. 8, a fill sensor (e.g., any of the piezo sensors described herein) may be positioned at a location 803 or a location 805, respectively. A liner 808, which may be a tank liner made available from Nittel GmbH & Co. KG, with offices in Raunheim, Germany, may be inserted into the tank 802. The liner 808 may include or more layers composed of any material or combination of materials suitable for lining the tank 802 given the function (e.g., hygienic or cleaning) and the intended contents (e.g., beer). The liner 808 may in any of a plurality of suitable forms, for example, a foil, for conformation to the internal dimensions of the tank 802 and for insertion into the tank 802. The liner 808 may have a surface area 812 configured to be coupled to a surface area 816 of the top surface of tank 802, and an opening 810 to allow the tank 802 to be filled.

The tank 802 may have an opening 814 configured to align with the opening 810 to allow the liner 808 to be filled via the opening 810 until it conforms to internal dimensions of the tank 802 when full (i.e., when at capacity). The opening 814 may serve to allow the insertion of beer or other beverages into the tank 802, for example, while lined with the liner 808. The tank 802 also may include an opening 818, which can be used to insert the liner 808 into the tank 802 or to undertake other services, for example, by applying appropriate techniques, such as rolling out liners and linking them via the opening 814 to the outside of the tank or other known techniques for inserting a liner into a tank. The surface areas 812, 816 may be coupled together by welding using, for example, ultrasonic welding. For additional coupling (e.g., if coupling the surface areas 812, 816 is deemed to be potentially insufficient), ultrasonic gel or other coupling agents may be used.

A sensor device (e.g., the sensor device 200) coupled to a container that has a liner coupled internally thereto, for example, as described above, may be configured to determine fill levels of such a lined container. For example, the IPU 204 and/or 218 may be configured to take into consideration the expanding size of the liner 808 (in multiple dimensions) within the container 802 as it is filled with a liquid, and to take into account the reflections of signals (e.g., generated by a piezo crystal) from the surface(s) of the one or more layers of the liner 808. Similarly, one or more components of the sensor device may be configured to factor in the impact of the liner on other properties detected (e.g., air pressure, humidity, temperature). That is, one or more components of the sensor device may be configured to filter information received from various sensors to accommodate the presence of the lining. These one or more components of the sensor device may be configured to factor the positions of the openings 810, 814 and surface areas to be coupled 812, 816 of the liner 808 and the tank 802, respectively.

Figure 9A:
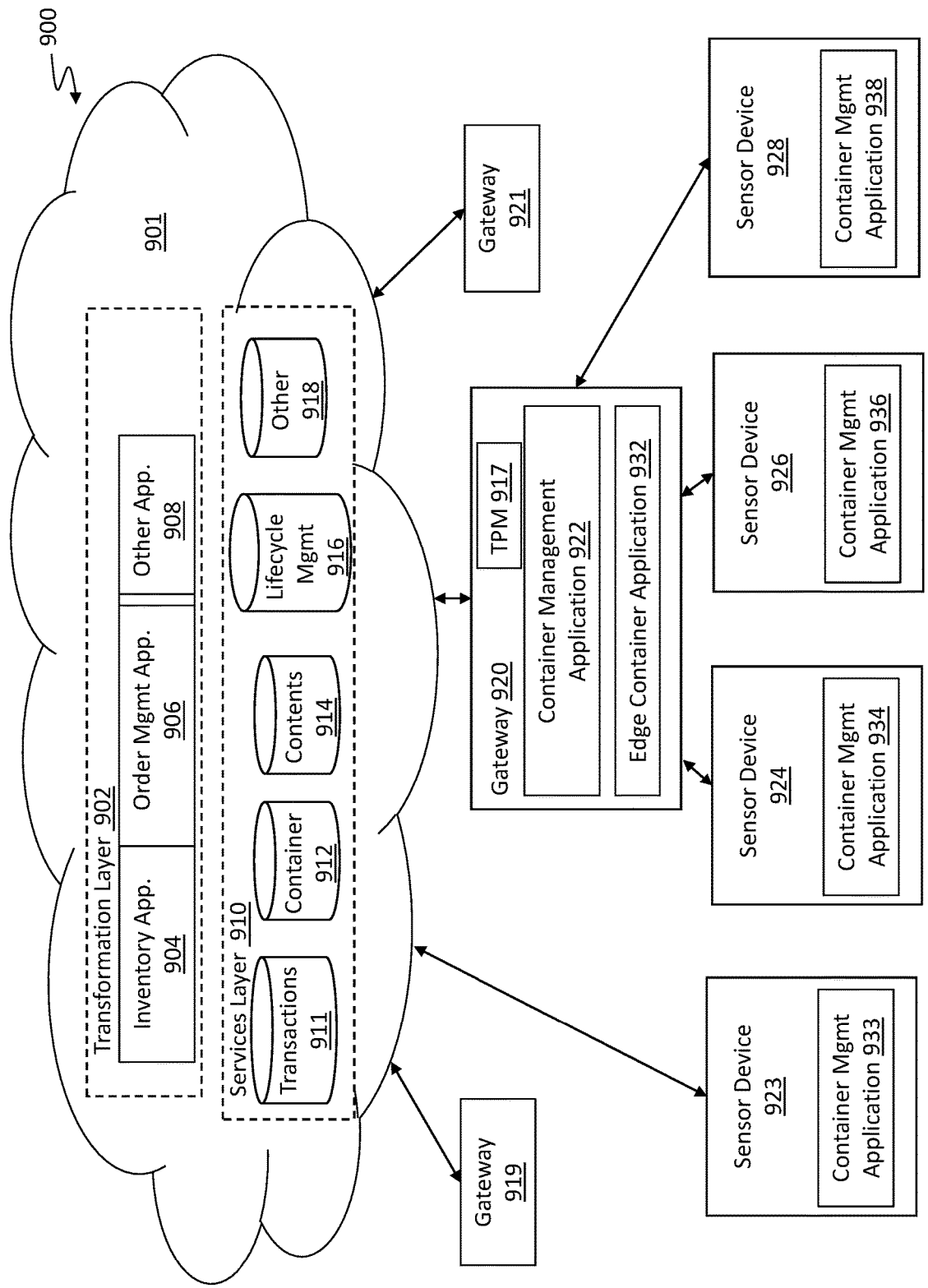
FIG. 9A is a block diagram illustrating an example of a system for remotely monitoring and managing containers, according to embodiments of the system described herein.

FIG. 9A is a block diagram illustrating an example of the system 900 for remotely monitoring and managing containers, according to embodiments of the system described herein. Other embodiments of the system for remotely monitoring and managing containers, for example, variations of the system 900, are possible and are intended to fall within the scope of the invention. The system 900 also may be referred to herein as a container management network. System 900 may include any of: one or more sensor devices 923, 924, 926 and 928; one or more gateways 919-921; the transformation layer 902, services layer 910 and other components in the cloud 901; other components; and any suitable combination of the foregoing. It should be appreciated that, while only three gateways and four sensor devices are shown in FIG. 9A, the invention is not so limited, as any number of gateways and sensor devices may be used, taking into consideration the feasibility given the fiscal and management costs of equipment and network, compute and storage resources. Each of the sensor devices 923, 924, 926 and 928 may be implemented as the sensor device 200 or a variant thereof, and may be physically coupled to one or more containers, for example as described in relation to FIGS. 2-7B and elsewhere herein.

Each of the gateways 919-921 may be coupled to the cloud 901 and a plurality of sensor devices; for example, as the gateway 920 is coupled to the sensor devices 924, 926 and 928. Each gateway may couple one or more sensor devices to the cloud 901, which may include one or more servers. In some embodiments, one or more sensor devices, e.g., the sensor device 923, may be connected directly to the cloud. In such embodiments, the sensor device 923 may be configured with any of the gateway functionality and components described herein and treated like a gateway, at least in some respects, by the cloud 901.

Each of the gateways 919-921 may be configured with one or more capabilities of a gateway and/or a controller as described in U.S. Pat. No. 9,509,628, titled "Managing Devices in a Heterogeneous Network," issued Nov. 29, 2016, to Bernd Moeller (hereinafter the '628 patent), including capabilities described in relation to FIGS. 1 and 2 (and elsewhere) of the '628 patent. Each of the gateways 919-921 may be any of a plurality of types of devices configured to perform the gateway functions defined herein, such as, for example, a general-purpose computer, a more specialized device such as an MYNXG® gateway or controller available from MyOmega (e.g., MYNXG® i2, d3 or d3.1 models), any of variety of other devices, or any suitable combination of the foregoing.

Each gateway may include a TPM 917 (e.g., in a hardware layer of a controller described in the '628 patent), which may be used to perform any of a variety of data security operations, including encrypting portions of communications from/to sensor devices to/from gateways, or encrypting portions of such information received at a gateway unencrypted. TPMs also may be employed for other data security operations used in various embodiments of the system described herein, including generating a one-way hash (or other type of hash) of a transaction record, or providing secure communications between components of the system 900, e.g., between the cloud 901, gateways and sensor devices. For example, TPMs or other components of the system 900 may be configured to implement Transport Layer Security (TLS) for HTTPS communications and/or Datagram Transport Layer Security (DTLS) for Constrained Application Protocol (CoAP) communications, e.g., as described in the '628 patent. Furthermore, one or more security credentials associated with any of the foregoing data security operations may be stored on a TPM. The performance and security of the system described herein may be improved by sensor devices, gateways and servers in the cloud 901 using TPMs for these data security operations. A TPM may be implemented within any of the gateways, sensor devices or servers in the cloud 901, for example, during production, and may be used to personalize the gateway or the sensor device. Such gateways, sensor devices and/or servers may be configured (e.g., during manufacture or later) to implement a Public Key Infrastructure (PKI) for the management of keys and credentials. Other cryptographic technologies may be used.

Figure 10:
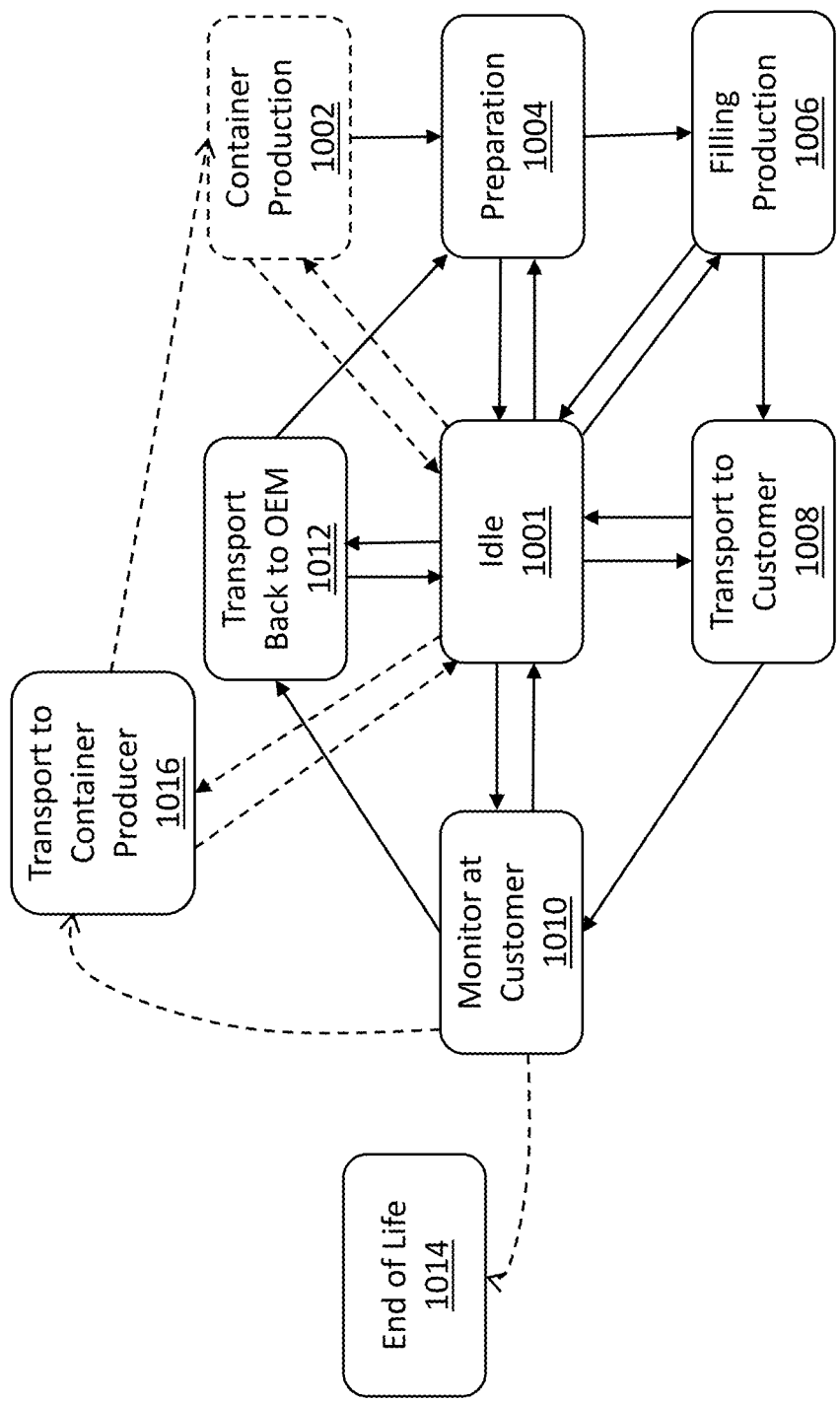
FIG. 10 is a state diagram illustrating an example of a plurality of defined states of a container lifecycle, according to embodiments of the system described herein.
Figure 11:
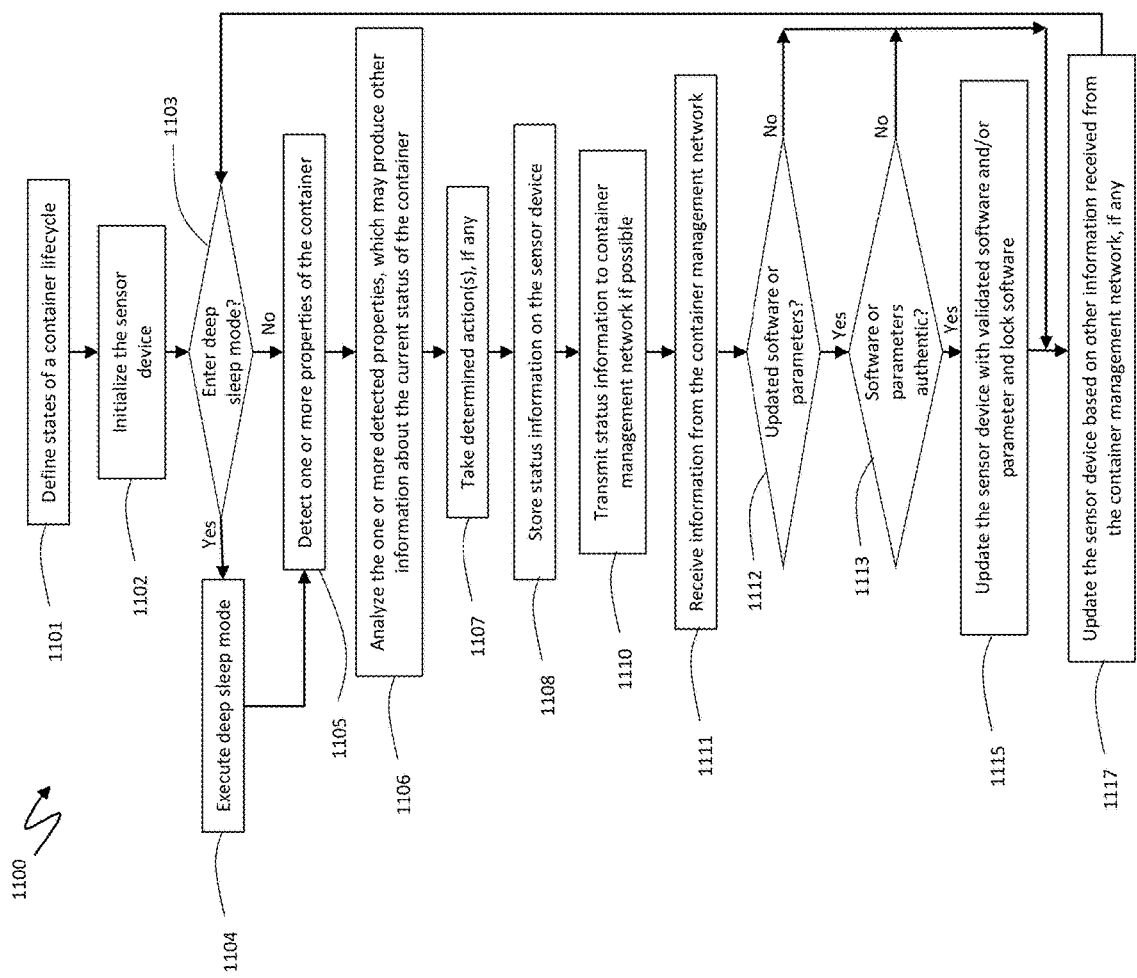
FIG. 11 is a flowchart illustrating an example of managing a lifecycle of a container, according to embodiments of the system described herein.

Each of the gateways 919-921 may be configured to process container status information received from a sensor device, including analyzing detected physical properties and other information that may have been generated or received by the sensor device, and providing instructions to the sensor device, as described in more detail in relation to FIG. 11 and elsewhere herein. For example, each of the gateways 919-921 may be configured with one or more container management applications 922 encapsulating such capability. Further, each of the gateways 919-921 may include one or more edge container applications 932 that may provide additional functionality to that of the one or more container management applications 922, including for example, one or more functions pertaining to commissioning, filling, cleaning, incoming good inspections and certification (e.g., after 2 years), consumption and other processing of containers. It should be appreciated certain container management functions may be shared between one or more container management applications 922 and edge container applications 932. Each of the gateways 919-921 may include one or more components (which may be referred to herein as container management components) for implementing the one or more container management applications 922, the one or more edge container applications 932, or combinations thereof. The one or more container management applications 922 and/or edge container applications 932 may be configured to perform some or all of the analysis and/or control some or all of the actions described in relation to FIGS. 10, 11, 12, 13 and elsewhere herein, in implementing one or more defined states of a container lifecycle. Each gateway may be configured to implement any of the network communication technologies described herein in relation to the sensor device 200 so the gateway may remotely communicate with, monitor and manage sensor devices.

Each of the sensor devices 923, 924, 926 and 928 also may include one or more container management applications 933, 934, 936 and 938, respectively, having some or all of the same capability of container management application 922, and each of the sensor devices 923, 924, 926 and 928 may include one or more components (which may be referred to herein as container management components) for implementing the one or more container management applications 933, 934, 936 and 938, respectively. For example, the IPU 204 and/or one or more other components of the sensor device 200 may be configured to implement one or more container management applications, and may collectively, or each individually, be considered a container management component. By performing such processing at one or more gateways, and/or at the sensor devices themselves, as opposed to in a more centralized fashion on one or more servers in the cloud 901, the system 900 may implement and enjoy the benefits of more distributed edge-computing techniques.

The services layer 910 may provide one or more services, which may be consumed by applications in the transformation layer (which can also be referred to as an application layer) 902. The services may include services for managing things, and the data and mobility of the things, for example, database management services for the transaction database 911, container database 912, container contents database 914 and lifecycle management database 916. The container database 912 may include information about containers managed by the system 900 such as, for example, mechanical specifications, geometries, date of creation, material composition and other information. The container contents database 914 may include information about the contents (e.g., liquids, bulk solids, powders) of the container being managed such as, for example, ingredients, chemical composition, classification (e.g., pharmaceutical, beverage, food), properties and other information collected over time, and other information about the contents. Properties of a container may include physical properties associated with a container, such as, for example, climate conditions, location, weight, and fill level, as well as other properties. Various other information, including properties, of a container, its contents and its lifecycle may be stored in one or more of the databases 912, 914, 916 and 918, including, for example, an ATEX classification of a container's contents or intended contents, a maximum fill level of a container, and regulatory-related information. For a given container, the information stored in the container database 912 and/or the container contents database 914 may include the same information as is stored in the container itself, which in combination with the information about the container itself may be considered a virtual representation of the container, e.g., a digital twin. The lifecycle management database 916 may store information about the states, rules, algorithms, procedures, etc. that may be used to manage the container throughout the stages of its lifecycle, as described in more detail elsewhere herein. Other databases 918 may be included in the services layer 910. The services layer 910 may be implemented using one or more servers in the cloud 901.

The transaction database 911 may include one or more transaction records, for example transaction blocks of a blockchain, involving containers managed by the system 900. For example, the blockchain may serve as a secure transaction register for the system 900 or one or more defined sub-systems thereof. Transactions may include smart contracts or any other commercial transaction involving one of the managed containers, additionally they also may include information, for example status information, relating to one or more containers, that is not associated with a commercial transaction, as described in more detail elsewhere herein. Further, the data stored within each of the other databases 912, 914, 916 and 918 within the services layer 910 may be stored as one or more transaction records (e.g., transaction blocks within a blockchain), and may be part of the transaction register for the container management system 900 or one or more defined sub-systems thereof.

The transformation layer 902 may include any of a variety of applications that utilize information and services related to container management, including any of the information and services made available from the services layer 910. The transformation layer 902 may include any of: inventory application 904, order management application 906, one or more other applications 908, or any suitable combination of the foregoing. The inventory application 904 may provide an inventory of containers managed within the system (e.g., the system 900 or a defined subsystem thereof), including properties (e.g., characteristics) about each container in the system, and the contents thereof, including the current state of the container within its lifecycle, a fill level of the container, current location (e.g., one or more network identifiers for a mobile telephony network, Wi-Fi network, ISM network or other) and any other properties corresponding to a container described herein. The inventory of containers may be a group (e.g., "fleet") of containers owned, leased, controlled, managed, and/or used by an entity, for example, a container producer, OEM, transporter or consumer, another type of entity, or any suitable combination of the foregoing.

The order management application 906 may manage container orders of customers, for example, all customers of an entity, e.g., an OEM. The order management application 906 may maintain information about all past and current container orders for customers of an entity and process such orders. The order management application 906 may be configured to automatically order containers for an entity (e.g., a customer or OEM) based on container status information received from sensor devices physically coupled to containers (e.g., via one or more gateways or directly from the sensor device itself). For example, the application may have one or more predefined thresholds, e.g., of empty containers, damaged containers, fill levels of containers, etc., after which being reached or surpassed (e.g., going below a fill level and/or number of non-empty and non-damaged containers) additional containers should be ordered. The one or more other applications 908 may be any type of application, for-example, a value-add and/or business application, related to management of containers. The inventory application 904, order management application 906 and one or more other application 908 may be configured (e.g., via one or more APIs or other interfaces) to interact with other applications within the transformation layer 902, including each other. These applications or portions thereof may be programmed into gateways and/or sensor devices of the container management network as well.

The transformation layer 910 may be implemented using one or more servers. Container information may be communicated between components of the system 900, including sensor devices, gateways and components of the cloud 901, in any of a variety of ways. Such techniques may involve the transmission of container information in transaction records (e.g., blocks) of a blockchain or the like (e.g., using cryptographic techniques), and/or the storage of such records or information therein as part of blockchains or the like, for example, as part of a transaction register, as described in more detail elsewhere herein. Such transaction records may include public information and private information, where public information can be made more generally available to parties, and more sensitive information can be treated as private information made available more selectively, for example, only to certain container producers, OEMs and/or customers. For example, the information in the transaction record may include private data that may be encrypted using a private key specific to a container and/or sensor device, and may include public data that is not encrypted. The public data may also be encrypted to protect the value of this data and to enable the trading of the data, for example, as part of a smart contract. The distinction between public data and private data may be a matter of degree. For example, both public data and private data may be proprietary to a party, but the private data may be deemed more sensitive, e.g., more of a secret, and thus protected as such. For example, the public data may be basic specifications associated with a container, which a party is willing to share with any customer or potential customer, whereas the private data is data the party may be data the party is only willing to share with a technology or business partner, for example, for a payment or license fee. Accordingly, public data may not be encrypted at all, enabling any party given access to the transaction record access to the public, or may be encrypted using a different credential (e.g., key) than the private data, so that a party can be more selective in enabling access to the private data; i.e., only give credentials associated with the private data to parties to certain contracts. Encrypted data, whether public or private, may be accessible only to those parties having a key corresponding to the private key, for example, the private key itself in a case in which symmetric cryptography is employed, or a corresponding public key in a case in which asymmetric public key cryptography is employed. In this manner, parties owning information corresponding to a container, sensor device or other device may make some portions of the information public and other portions private to only select parties, for example, according to a smart contract, as described below in more detail.

The number of communications between components of the system 900 may be minimized, which in some embodiments may include communicating transactions (e.g., container status information) to servers within the cloud 901 according to a predefined schedule, in which gateways are allotted slots within a temporal cycle during which to transmit transactions (e.g., report container status information) to one or more servers. Each transaction transmitted from a gateway to a server may include container information received from one more sensor devices in one or more communications (e.g., status reports) sent from the sensor devices since a last such transaction was sent to the server, and may in some embodiments include only changes to information since a last transaction. Container information may be collected, stored and managed in a computationally efficient and secure manner that ensures to a high degree of certainty the integrity of the container.

It may be desirable to engage in commercial transactions involving containers, for example, purchases, leases, licenses and other types of transactions, and blockchains may be used as part of contractual transaction between transacting parties. For example, the purchase or lease may include the seller providing the buyer access to and/or control of a transaction register of one or more containers; e.g., in the form of a blockchain. Going forward from the time of the transaction, the buyer may continue to grow the blockchain, and at later date provide access to or control of the blockchain to a future buyer or other transacting party. In some embodiments, the contractual transaction itself is implemented using blockchains or the like. That is, a blockchain can be used to implement a "smart contract" between parties, for example, by defining the rules (i.e., terms) of the contract (including payment terms, access to information, timing, etc.), enforcing the rules of the contract, and recording the execution of the contract and/or transactions under the contract as transaction blocks of a blockchain. For example, a blockchain may define a license scheme (e.g., one-time fee, installment payments, pay-per-use, etc.) involving a fleet of containers, or subcomponents (e.g., parts) thereof as described herein, and record transactions under such a contract as transaction blocks of a blockchain. In some cases, the smart contract may define the rules for the exchange of information related to a fleet of containers or parts thereof, or a subset thereof.

Such smart contracts may define rules governing the exchange of public and private data/information as described herein, and record the results of a transaction in relation to same. For example, a smart contract may define the rules by which a first party, e.g., a customer, is allowed access to public or private information of an OEM, e.g., the proprietary specification for a container, sensor device or combination thereof, in exchange for public or private information of the customer for container, sensor device or combination thereof, or perhaps in exchange for currency, e.g., bitcoins, or another asset. Proprietary information may include, for example, internal designs, proprietary interfaces, benchmarking results, other test data, manufacturing reliability data, customer lists, price lists, source code, etc. A smart contract may be defined to provide a party to the contract one or more keys (e.g., a private and/or public encryption keys) or other credential that provides access to encrypted public or private information, for example, in response to a payment made by the party, performance of an action, or in exchange for some other form of consideration. The use of smart contracts may be applied to the management of container lifecycles as described herein and commercial transactions in relation thereto.

In some embodiments, information may be collected from one or more sensor devices (e.g., the sensor devices 924, 926, 928), for example, over a predetermined period of time, and may be grouped into a single secure transaction record. The secure transaction record may be sent from a gateway (e.g., one or more of gateways 919-921) to a server (e.g., residing within the cloud 901). Further, in embodiments in which a sensor device (e.g., the sensor device 923) communicates directly with one or more servers in the cloud, the sensor device itself may group information it has detected or determined over time about one or more containers into a single secure transaction record that it transmits to the server. Each secure transaction record may include a one-way hash of, and a reference (e.g., link or pointer) to, an immediately preceding secure transaction record for the overall system (e.g., network) for which information is being tracked. A hash of a secure transaction record is the output of a mathematical function, algorithm or transformation (hereinafter "hash function") applied to the secure transaction record. The hash function may be configured to produce a hash value that can be represented by a data structure (e.g., a string) of uniform size or range of sizes. In some embodiments of the system described herein, the hash is a one-way hash in that the hash function that produced the hash value (hereinafter a "cryptographic hash function") is infeasible to invert. By making the one-way hash part of the next (i.e., current) secure transaction record, it can be determined if an immediately preceding record has been altered because the one-way hash generated from the altered secure transaction record will not match what is stored in the next transaction in the chain. Furthermore, in embodiments of the system described herein, each secure transaction record includes a one-way hash of, and a reference (e.g., link or pointer) to an immediately preceding secure transaction record, forming a continuingly growing temporal list of records referred to herein as a record chain. Altering any secure transaction record in the record chain will have a cascading effect changing the expected one-way hash of every future secure transaction record, such that the source altered record can be determined. Thus, using a one-way hash function (or mathematical asymmetric hash function) enables, along with other features described herein, reliable tracking of container information in a system. Any of a variety of cryptographic one-way hash functions may be used, for example, MD4, MD5, SHA-1 and SHA-2.

In some embodiments, a record chain may be implemented using a blockchain, each secure transaction record of the record chain being implemented using a transaction block of the blockchain (also known as a block-chain or block chain). A blockchain is a continuously growing list of records, called blocks, which are linked and secured using cryptography. Each block contains transaction data or information, and may contain a hash pointer as a link to a previous block (i.e., an immediately preceding block in the chain), and a time stamp. By design, blockchains are inherently resistant to modification of the data. Blockchains may be considered an open, distributed ledger that can record transactions between two parties efficiently and in a verifiable and permanent way. For use as a distributed ledger, a blockchain may be managed by a peer-to-peer network collectively adhering to a protocol for validating new blocks. Once recorded, the data in any given block cannot be altered retroactively without the alteration of all subsequent blocks, which requires collusion of the network majority. Blockchains are considered secure by design and may be considered an example of a distributed computing system with high Byzantine fault tolerance. Although various embodiments of the system described herein use blockchains, the invention is not so limited. Other appropriate technologies may be employed to record transactions herein or to implement a record chain, where such technologies are inherently resistant to modification of the data and can record data in a verifiable and permanent way that preserves temporal relationships between the data blocks so that, for example, deletion/removal of any block(s) in the chain may be detected. Once the data is recorded in any block, such data cannot be altered retroactively without the alteration of all subsequent blocks in the block-chain.

Figure 9B:
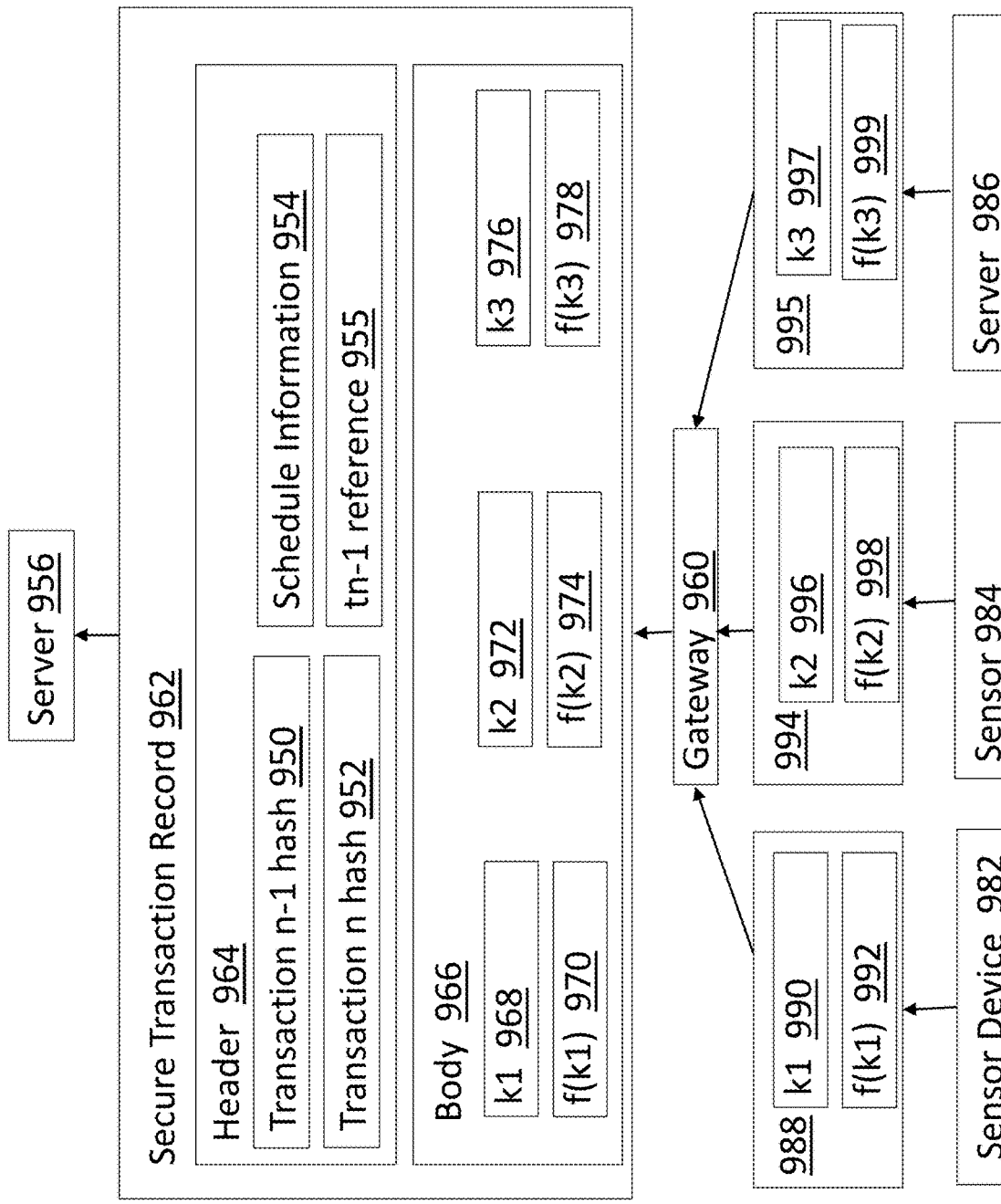
FIG. 9B is a block diagram illustrating an example of using secure transaction records to communicate and store container-related information on a container management network according to embodiments of the system described herein.

FIG. 9B is a block diagram illustrating an example of using a secure transaction record 962, for example, a transaction block of a blockchain, to communicate and store container-related information on a container management network according to embodiments of the system described herein. Other secure transaction record formats, for example, variations of the secure transaction record 962, are possible and are intended to fall within the scope of the system described herein.

A plurality of sensor devices 982, 984, 986 may send (e.g., transmit) communications 988, 994, 320, respectively, to a gateway 960 (e.g., one of the gateways 919-921) concurrently or at different times, for example, in accordance with a predefined schedule, in response to an event (e.g., a determined change in property and/or state of a container) or in response to user input (e.g., a data request). Each of the communications 988, 994, 995 may include public information elements 990, 996, 997, respectively, and private information elements 992, 998, 999, respectively, described in more detail elsewhere herein. The gateway 960 may generate a secure transaction record 962 and may send the secure transaction record 962 to a server 956 (e.g., in the cloud 901). The secure transaction record 962 may include a transaction header 964 and a transaction body 966. The transaction body 966 may include public information elements 968, 372, 376 corresponding to the public information elements 990, 996, 322, respectively, and private information elements 970, 974, 978 corresponding to the private information elements 992, 998, 999, respectively.

The transaction header 962 may include a one-way hash 950 of an immediately preceding secure transaction record, $t_{n-1}$, a reference (e.g., link or pointer) 955 to the immediately preceding secure transaction record, $t_{n-1}$, a one-way hash 952 of a current secure transaction record, $t_n$, and schedule information 954. The one-way hash of $t_{n-1}$ may have been obtained from the server 956 in response to a request, or, in another embodiment, in an update from the server 956 in response to submission of another secure transaction record to the server 956. In some embodiments, information included in the record transaction body 966 may include only information corresponding to a container that has changed since a last transaction. In some embodiments, information unchanged since a last transaction is included in the transaction record body 966, and there is a mechanism for indicating which information has changed. The transmission of secure transaction records from gateways to a server (or directly from a sensor device to a server) may be scheduled using predetermined time slots within a cycle. The transmission schedule may be defined, stored and/or under control of the server to which record transactions are transmitted, and may be implemented using any of a variety of technologies, including a cloud-based scheduler. The schedule information 954 may specify the predetermined time slot within a cycle for transmission of the secure transaction record 962 to one or more servers in the cloud 901.

The secure transaction records transmitted from gateways to servers (e.g., the secure transaction record 962) may be stored on the server as part of a transaction chain for the gateway, i.e., a transaction chain representing a container management system corresponding to the gateway. The server (e.g., the server 956) also may store the transaction record as part of a transaction chain corresponding to a container management system at the server/cloud level, for example, for which container management systems at the gateway level are subsystems. For example, one more servers in the cloud 901 may store a transaction chain that includes transaction records corresponding to gateways 919-921, as well as transaction chains corresponding to sensor devices (e.g., the sensor device 923) directly connected to one or more servers in the cloud 901. While FIG. 9B has been described primarily in relation to communicating information from sensor devices through gateways to servers in the cloud, it should be appreciated that the invention is not so limited. In some embodiments of the system described herein, a sensor device (e.g., the sensor device 923) may collect container information over time and transmit a secure transaction record like that described herein directly to one or more servers in the cloud without use of a gateway.

FIG. 10 is a state diagram illustrating an example of a plurality of defined states of a container lifecycle, according to embodiments of the system described herein. Other embodiments of states, for example, variations the states depicted in FIG. 10, are possible and are intended to fall within the scope of the invention. For example, the same or similar states may be defined and used for other types of things besides containers. The states may include any of: an idle state 1001; a container production state 1002; a preparation state 1004; a filling production state 1006; a transport-to-customer state 1008; a monitor-at-customer state 1010; a transport-back-to-OEM state 1012; an EOL state 1014; a transport-to-container-producer state 1016; other states; or any suitable combination of the foregoing. Each state other than the idle state 1001 may be referred to herein as an active state, and collectively such states may be referred to as active states. Each arrowed line between states in FIG. 10 illustrates a potential state transitions, with the direction of the arrow indicating the direction of the transition. It should be appreciated that more states or less states may be defined for the lifecycle of a container or defined but not used. In some embodiments, it may be desirable to maintain a smaller number of states to reduce an amount of resources (e.g., compute, networking and/or storage resources) consumed in managing the lifecycle of a container or a group of containers. For example, in some embodiments, states involving the container producer (1002 and 1016) and the EOL state 1014 may not be defined or used, such that only the states 1001, 1004, 1006, 1008, 1010 and 1012 are defined and used.

In the idle state 1001, a container may be idle, for example, during a deep sleep mode, in which power consumption may be minimized. In some embodiments, the idle state 1001 may be transitioned to/from any of the active states, as described in more detail elsewhere herein. The term "deep sleep mode" may be used herein to refer to a cyclical mode of operation of the sensor device during which the sensor device iteratively transitions between the idle state 1001 and one of the active states, during which the sensor device is in the active state for only a fraction of a percentage of time relative to time spent in the idle state 1001, and sensor status information is reported to a container management network during the active state if possible. In some embodiments, deep sleep mode may be implemented by mechanisms described elsewhere herein.

The sensor device may be configured to transition from an active state to the idle state 1001 in response to a variety of conditions, for example, any of: an instruction (e.g., received from container management network); determining a passage of a predetermined amount of time without any activity (e.g., no change in any properties); determining a passage of a predetermined amount of time without a change to one or more particular properties; and/or determining a predefined time of day (e.g., after hours of operation) and/or day of the week (e.g., weekend), month or year (e.g., holiday). The conditions under which each state may transition to the idle state 1001 may be different, as described in more detail elsewhere herein. In some embodiments of the system described herein, a transition to the idle state 1001 may be conducted in accordance with the method 1300 described in relation to FIG. 13.

In the container production state 1002, a container producer produces (e.g., manufactures) a container or prepares a used container. During this state, a physically coupling of the sensor device (e.g., the sensor device 200) to the container may be performed, for example, resulting in the sensor device being physically coupled, as described elsewhere herein, for example, as described in relation to FIGS. 5-8. The container production state 1002 may transition to the idle state 1001 or the preparation state 1004. In the preparation state 1004, an OEM prepares a container, which may include repairing, cleaning and/or testing of the container. The preparation state 1004 may transition to the idle state 1001 or the filling production state 1006. In the filling production state 1006, the OEM fills the container with contents, for example, liquid, bulk solid material or powder.

The filling production state 1006 may transition to the idle state 1001 or the transport-to-customer state 1008. In the transport-to-customer state 1008, the container is transported from the OEM to customer premises (or perhaps other premises on behalf of the customer). The transport-to-customer state 1008 may transition to the idle state 1001 or the monitor-at-customer state 1010. In the monitor-at-customer state 1010, the contents of the container are consumed by the customer, for example, in one or more iterations. The monitor-at-customer state 1010 may transition to any of the states 1001, 1012, 1014 or 1016. In the transport-back-to-OEM state 1012, the container is being returned to the OEM. The transport-back-to-OEM state 1012 may transition to the idle state 1001 or the container production state 1002. In the EOL state 1014, as an alternative to transition from monitor-at-customer state 1010, the container is in an end-of-life (EOL) state, as a result of having been discarded by the customer. In the transport-to-container-producer state 1016, as an alternative to being in the state 1012 or the state 1014, the container is in a state of being transported back to the container producer. The transport-to-container-producer state 1016 may transition to the idle state 1001 or the container production state 1002. The conditions under which states transition to other states are described in more detail below.

During the preparation state 1002, a container may be cleaned and the temperature of the container, as well as other properties and information, may be monitored and controlled. For example, the duration of a cleaning may be recorded along with the temperature within a housing of a sensor device coupled to the container from which a temperature of steam or other cleaning agent or substance resulting from cleaning may be estimated. Based on such recorded duration and temperature, cleaning quality information may be documented. In some embodiments, the sensor device may be configured to provide a notice and/or alarm if a temperature reaches a certain threshold, or even stop a cleaning process if coupled to an automated system performing the cleaning. Different notices and/or alarms may be configured for different thresholds. Such thresholds may be determined and configured to protect the container, the sensor device or components thereof, for example, to prevent a battery within or physically connected to the sensor device from exploding and thus damaging other components of the sensor device.

It may be desirable when preparing a container to conduct one or more quality inspections of the container. Accordingly, the sensor device may be configured during the preparation state 1002 to control and/or assist in conducting a quality inspection. For example, the sensor device may include one more components (e.g., described elsewhere herein) to assist in conducting high-frequency sampling and analysis of resonant frequencies of the container to determine whether the container satisfies certain physical requirements and/or has been damaged (e.g., by comparison to predefined parameter values and/or previous measurements). Such sampling and analysis can be done via integrated acceleration/microphone measurements in response to an inspector performing a smooth hammering on the container. While the sensor device may be configured to process and analyze the data sampled by its one or more sensors, one or more gateways, servers, or other elements of a container management network (e.g., the system 900) may be involved in performing analysis of the sampled data, for example, mathematical analysis such as Fast Fourier Transform (FFT) analysis. Inspecting the physical quality of, including detecting damages to, the container using resonant frequency analysis may be preferred over employing an x-ray device to perform x-ray analysis (e.g., to detect capillary cracks), as such an x-ray device and/or use thereof may be relatively expensive. Other aspects of the container may be monitored, and/or other actions controlled during the preparation state 1004.

The sensor device may be configured to transition from the preparation state 1004 to the idle state 1001 in response to: an instruction (e.g., from container management network); in response to determination of passage of a predetermined amount of time without any activity (e.g., no change in any physical properties); and/or determination of a predefined time of day (e.g., after hours of operation) and/or day of the week (e.g., weekend), month or year (e.g., holiday). The transition from the preparation state 1004 to the idle state 1001 may be performed in accordance with mechanisms described elsewhere herein.

The sensor device may be configured to transition from the preparation state 1004 to the filling production state 1006 under one or more conditions. In some embodiments, such a state transition may occur in response to determining that the sensor device (and by inference the container) has changed location to a filling location. The location change may be determined using one or more of the networking technologies described elsewhere herein. For example, the sensor device may be configured to determine a transition from the preparation state 1004 to the filling production state 1006 based on determining a move to a filling location based on one or more detected: cellular network cells (e.g., based on cellular IDs), Wi-Fi networks, GPS location or ISM location. In some embodiments the sensor device may be pre-programmed with the cellular ID, Wi-Fi network ID, ISM location and/or GPS location of one or more filling locations, and the IPU of the sensor device may determine when one of these parameter values has been sensed by the associated interface or other logic. Given the possible geographic proximity (e.g., same building and/or room) of the location at which the container is prepared with the filling location, it may be desirable to use a network location technology that provides relatively precise location information to determine such a transition, for example, ISM or GPS technology, or UWB Real Time Localization Services, rather than cellular or Wi-Fi technology. In determining the location technology or technologies with which to configure the sensor device to determine location movement, the cost of using the technology may be taken into consideration in addition to the precision of the location technology. Such consideration may be made for any transition between defined states of a container lifecycle involving detection of location movement.

The sensor device also may be configured to transition from the preparation state 1004 to the filling production state 1006 in response to receiving instructions, for example, from a user via a gateway, user device and/or other component of a container management network. During the filling production state 1006, if not already recorded, a network ID (e.g., cellular ID or Wi-Fi ID) or other indication of location may be recorded, which then can be used to determine a location change that may signify a transport of the container. With respect to cellular networks, the IDs of neighboring cells may be recorded as well.

A sensor device may be configured to store, for example, during the filling production state 1006, a product identifier of the container, an identifier of the sensor device itself, information about the contents with which the container is being filled, product specifications of any of the foregoing, an address or other location ID of an intended customer, other information, or any suitable combination of the foregoing. Such information may be stored in a non-volatile memory of the sensor device, and portions of such information may be obtained via the network interfaces for one or more networks described herein, including the container management network 900. During the filling production state, the fill level of the contents of the container may be monitored and recorded, and in some embodiments controlled (e.g., if an automated filling device is coupled to the sensor device), by the sensor device. Other measurements may be made during the filling production state 1006 by the sensor device, for example, the measurement of one or more physical properties such as pressure within the container, which may be used to determine the gas protection of the contents with which the container is filled.

The sensor device may be configured to transition from the filling production state 1006 to the idle state 1001 in response to: an instruction (e.g., from the container management network); in response to determination of passage of a predetermined amount of time without any activity (e.g., no change in any physical properties); and/or determination of a predefined time of day (e.g., after hours of operation) and/or day of the week (e.g., weekend), month or year (e.g., holiday).

The sensor device may be configured to transition from the filling production state 1006 to the transport-to-customer state 1008 under one or more conditions. In some embodiments, such a state transition may occur in response to determining that the sensor device (and by inference the container) has changed location (i.e., moved away) from a filling production site. The change in location may be determined using one or more of the networking technologies described elsewhere herein, for example, by detecting a transition between one or more cellular network cells, a movement within a cell, a change in GPS location or a transition between one or more Wi-Fi networks. For example, the sensor device may have recorded the cellular ID, Wi-Fi network ID, ISM location and/or GPS location of the filling location (and the cellular IDs of neighboring cells at this location) as values for corresponding parameters, and the IPU of the sensor device may determine when a determined value of one of these parameters for a current location no longer matches that of the filling station. For example, even if the cellular ID of the current cell has not changed, if the cellular IDs of the neighboring cells have changed, this may signify a change in location of the container. Further, the strength of cellular signals may be recorded during various lifecycle states of the container (e.g., the filling production state 1006), and the difference in strength measured at different times may signify a change in location, which may or not be interpreted to mean a change in state (e.g., a change from filling production state 1006 to transport-to-customer state 1008). The sensor device may be configured to determine (using one or more of the technologies above) whether a change in location should result in a change of state. For example, the sensor device may be configured to determine whether a change in location indicates a departure from an OEM, customer or container producer premises, may be configured to distinguish between a temporary departure (e.g., between proximate sites of a customer site) and a permanent departure (e.g., a return from a customer site to an OEM site).

The sensor device may be configured to be in a deep sleep mode during transport to a customer. That is, as described above, the sensor device may enter into a cyclical mode of operation during which the sensor device iteratively transitions between the idle state 1001 and the transport-to-customer state 1008. During each iteration of the deep sleep mode, the sensor device may remain in the transport-to-customer state 1008 for only a very small percentage of time relative to time spent in the idle state 1001 during which sensor status information is reported to a container management network (e.g., the system 900) if possible. During the transport to the customer, the sensor device may initially transition from the transport-to-customer state 1008 to the idle state 1001 in response to, for example: an instruction (e.g., from the container management network); in response to determination of passage of a predetermined amount of time without any activity (e.g., no change in any physical properties); or passage of a predetermined amount of time since the initial transition from the filling production state 1006 to the transport-to-customer state 1008.

During the transport-to-customer state 1008, information detected from the integrated ambient light sensor 214, and possibly information detected from one or more other sensors, may be detected and analyzed to determine whether there has been any damage or other degradation of quality to the container or contents thereof. For example, while being transported to the customer, the sensor device may be woken up from the idle state 1001 into the transport-to-customer state 1008 in response to movement detected by the movement sensor 216. The extent of the detected movement; i.e., of the acceleration and/or displacement, may vary from being very minor (e.g., from a small crack or bump in the road or too sharp of a turn) to being a severe shock (e.g., from a major pothole or an accident). The information detected and analyzed from the various sensors in response to the sensor device being woken up can help make this determination.

Other information detected from various sensors at different times (e.g., each time the sensor device is woken up) during the transport-to-customer state 1008, for example, air temperature, humidity and pressure, may be used to assess a dynamic impact on the contents of the container over time. For example, in the case of the contents being food, beverage, lacquer, chemicals or medication, or other suitable materials, such assessment may be used to estimate "best-if-used-by" or "best before" dates, expiration dates and the like. This same analysis may be performed while the container is in other states as well, for example, the filling production state 1006 and the monitor-at-customer state 1010.

The sensor device may be configured to transition from the transport-to-customer state 1008 to the monitor-at-customer state 1010 under one or more conditions including, for example, conditions determined from detected properties and information received from the container management network. In some embodiments, such a state transition may occur in response to determining that the sensor device (and by inference the container) has arrived at a site of a customer, which may be determined using one or more of the networking technologies described elsewhere herein. For example, the sensor device may be configured with the cellular ID, Wi-Fi network ID, ISM location and/or GPS location of one or more customer sites, and the IPU of the sensor device may determine when a detected value of one of these parameters for a current location matches that of one of the customer sites.

While in the monitor-at-customer state 1010, the contents of the container may be consumed (i.e., emptied) all at once or in many iterations over time. An all-at-once emptying and each iteration of an emptying may be referred to herein as "emptying event." An emptying event often involves a coupling/uncoupling (e.g., screwing/unscrewing) of connectors to tubes, pipes, pumps, etc., and a vibration during emptying (e.g., as described below in relation to the method 1100). During the monitor-at-customer state 1010, the sensor device also may be configured to sample one or more movement sensors (e.g., the movement sensor 216), for example, acceleration sensors at a relatively high rate (e.g., 6 kHz), and possibly utilize information detected from one or more acoustic sensors, to detect such coupling/uncoupling and/or vibration to thereby determine the occurrence of an emptying event. The sensor device may be configured to record the number of emptying events that occur while the container is at a customer site (e.g., while in the monitor-at-customer state 1010), as this may be desirable for some industries, for example, the hygienic requirements of the food or beverage industry in various jurisdictions. The sensor device also may be configured to measure, record and report the fill level and optionally one or more other properties of the container and/or contents thereof, as described elsewhere herein, for each emptying event. The fill level and one or more other properties detected before, during and/or following each emptying event may be used to estimate an extent to which a container has been contaminated (i.e., polluted) over time. This estimate may prove important during a next preparation state 1004, for example, in determining the cleaning effort that will be required.

During the monitor-at-customer state 1010, the sensor device also may be configured to determine, e.g., using information detected by the movement sensor 216, integrated ambient light sensor 214, and perhaps other sensors, fraud conditions, accidents and or movements of the container, as described elsewhere herein. Also, while at the customer site, it may be desirable to mix ingredients within the container, and the sensor device may be configured in the monitor-at-customer state 1010 to monitor, report on and/or control the mixing.

The sensor device may be configured to transition from the monitor-at-customer state 1010 to the transport-back-to-OEM state 1012 under one or more conditions. In some embodiments, such a state transition may occur in response to determining that the sensor device (and by inference the container) has changed location (i.e., moved away) from the customer site. The change in location may be determined using one or more of the networking technologies described elsewhere herein, using techniques described herein. For example, the sensor device may have recorded the cellular ID, Wi-Fi network ID, ISM location and/or GPS location of the customer location (and the cellular IDs of neighboring cells at this location) as values for corresponding parameters, and the IPU of the sensor device may determine when a determined value of one of these parameters for a current location no longer matches that of the customer location, using techniques like those described above. The sensor device may be configured to determine whether a change in location indicates a departure from the customer premises and/or whether such departure is temporarily or permanent (in the context of a single cycle of a container lifecycle).

In embodiments in which the EOL state 1014 and/or the transport-to-container-producer state 1016 state are defined and used, the sensor device may be configured to transition from the monitor-at-customer state 1010 to the EOL state 1014 and/or transport-to-container-producer state 1016, respectively, using the same, similar and/or analogous techniques as described herein for transitions between other defined states.

The sensor device may be configured to be in a deep sleep mode during transport back to an OEM from a customer. That is, as described above, the sensor device may enter into a cyclical mode of operation during which the sensor device iteratively transitions between the idle state 1001 and the transport-back-to-OEM state 1012. Any of the actions described above in relation to the transport-to-customer state 1008 (except possibly transitioning to the monitor-at-customer state) may be performed during the transport-back-to-OEM state 1012. The sensor device may be configured to transition from the transport-back-to-OEM state 1012 to the preparation state 1004 under one or more conditions, for example, information received from the container management network. In some embodiments, such a state transition may occur in response to determining that the sensor device (and by inference the container) has arrived at a site of an OEM, which may be determined using one or more of the networking technologies described elsewhere herein. For example, the sensor device may be configured with the cellular ID, Wi-Fi network ID, ISM location and/or GPS location of one or more site of an OEM, and the IPU of the sensor device may determine when a detected value of one of these parameters for a current location matches that of one of the OEM sites.

In embodiments in which the transport-to-container-producer state 1016 state and the container production state 1002 are defined and used, the sensor device may be configured to transition from the transport-to-container-producer state 1016 to the container production state 1002 using the same, similar and/or analogous techniques as described herein for transitions between other defined states.

FIG. 11 is a flowchart illustrating an example of a method 1100 of managing a lifecycle of a container, according to embodiments of the system described herein. Other embodiments of a method of managing a lifecycle of a container, for example, variations of the method 1100, are possible and are intended to fall within the scope of the invention. The method 1100 may be implemented for a container having a sensor device (e.g., the sensor device 200) physically coupled thereto, and for which a plurality of states (e.g., those described in relation to FIG. 10 or elsewhere herein) are defined. The method 1100 may include consideration of a current state of a container and one or more properties detected from one or more sensors (e.g., any of those described in herein) of the sensor device and/or determined from information detected from the one or more sensors. While a fill level of a container may be of primary importance for a particular state (e.g., the Filling-Production state 1006 or the monitor-at-customer state 1010), other properties (e.g., temperature, air pressure, air humidity) detected from other sensors and analyzed along with one or more fill levels may better inform a current status of a container and/or a decision about an action to be taken, which may depend on the current state. Throughout the description of the method 1100, reference will be made at various times to an example of managing the lifecycle of a container of orange concentrate, e.g., for the beverage industry.

In a step 1101, the states of a container lifecycle may be defined, which may include any of the states describe above in relation to FIG. 10. These states may be stored on a plurality of components of a container management system, for example, on the sensor devices, gateways, one or more servers and possibly other components of the system 900 described in relation to FIG. 9A.

In a step 1102, the sensor device may be initialized, which may include defining an initial state for the container, for example, the idle state 1001 or the preparation state 1004. Initializing the sensor device also may include configuring the sensor device by loading software (e.g., including firmware) and software parameters onto the sensor device, including software and/or parameters for specific components of the sensor device, for example, components of the IPU 204 or the USC 218. The initial state of the container may be configured for the sensor device as part of loading the software. The software and software parameters may define one or more aspects of the functionality of the sensor device and/or components thereof described herein. For example, one or more algorithms may be specified by such software. An algorithm may be generic to all defined states of the lifecycle of the container, specific to one or more defined states, or even specific to certain modes or events within a certain predefined state. The functionality (i.e., behavior) of the sensor device, for example, one or more algorithms stored thereon, may be defined to be specific to particular use(s), industry(s) or content(s) that will be contained within the container (e.g., liquid, bulk solid, powder) and the expected lifecycle of the container given the intended use (e.g., commercial process) involving the contents. For example, the sensor device may be configured to manage the lifecycle of the container for containing orange concentrate for use in the beverage industry, as described in more detail elsewhere herein, in which the container may be a stainless-steel IBC like the IBC 102.

In a step 1103, it may be determined whether deep sleep mode should be entered. On a first pass through the method 1100, this determination may involve simply determining whether the current state is set to the idle state 1001, meaning that it was intended that the sensor device being in deep sleep mode. In future passes through method 1100, determining whether to enter into deep sleep mode may include one or more of the following: following an instruction (e.g., received from container management network); determining a passage of a predetermined amount of time without any activity (e.g., no change to any physical properties); determining a passage of a predetermined amount of time without a change to one or more particular properties; and/or determining a predefined time of day (e.g., after hours of operation) and/or day of the week (e.g., weekend), month or year (e.g., holiday). The step 1103 also may include factoring in the current defined state of the container, as different states may produce different results for the same or similar determined properties or other conditions. While the step 1103 is illustrated in FIG. 11 as being performed at a particular point in a series of steps of the method 1100, it should be appreciated that the step 1103, and the potential result of transitioning to deep sleep mode, may be performed at different times during the performance of the method 1100 after the sensor device is initialized in the step 1102. For example, determining whether to enter deep sleep mode may be performed as part of the step 1106, and the step 1107 may include transitioning to the step 1104 to execute deep sleep mode.

If it is determined in the step 1103 to enter deep sleep mode, then the method 1100 may proceed to step 1104, in which deep sleep mode may be executed. The method 1100 may return from deep sleep mode for one or more reasons described elsewhere herein and proceed to a step 1105, or proceed to the step 1105 directly from the step 1103 if it is determined not to enter sleep mode.

In the step 1105, one or more properties of the container may be detected. Such properties may include one or more properties detected by any of the sensors described herein, including a fill-level sensor, climate sensors or sensors of other physical properties. The step 1105 may be performed at specific predefined times, for example, at predefined intervals, at one or more specific times of a day, and/or specific days of a week, month or year. For example, the sensor device may be configured to detect sensor input at a predefined rate (e.g., a sampling rate), e.g., once every x hour(s), once every x minute(s), once every x second(s), less than a second, etc., and the sampling rate may be different for different times of day, or days of a week, month or year. One or more properties may be detected in response to an event, for example, user input, a signal transmitted from a sensor and/or a change in information transmitted from a sensor.

With respect to the example of orange concentrate, it is known that orange concentrate will separate into two general layers, a top layer of orange liquid and bottom layer of solid orange residual particles (e.g., pulp) as a result of gravity causing the heavier residual particles to fall and collect at the bottom of the container. The determined properties of step 1105 may include a fill level (e.g., height) of a surface of the bottom layer, and a fill level (e.g., height) of the surface of the top layer, determined for example by use of a USC (e.g., the USC 218 and/or the USC 301) and a piezo sensor as described above in relation in to FIGS. 2, 3, 5, 6 and elsewhere herein. The determined properties also may include a temperature of the orange concentrate and the pressure of the air in the container. For example, fill levels may be detected using an external temperature array coupled to the sensor device. Fill levels of the contents of the container may be determined (e.g., as part of the step 1106) based on temperature differences between the liquid and/or solid contents of the container and air. For example, the external temperature array may detect the temperature at one or more locations on the outside of the container surface where liquid or solid contents are present inside the container, and detect the temperature at one or more locations on the outside of the container surface where air (or protective gas) is present inside the container, and the difference between the detected temperatures may be used to determine the boundary (i.e., fill level) between the contents and the air, and between multiple contents within the container. The fill level may be determined by the external temperature array itself, the sensor device (e.g., the IPU), other components of the container management system or a suitable combination of the foregoing.

In a step 1106, the sensor device may analyze the detected properties, which may produce other information and/or result in action being taken. Such analysis may be based at least in part of the defined state of the container. This analysis may be performed by one or more components of the sensor device for example, the IPU 204 and/or the USC 218 of the sensor device 200. Such analysis may involve performance of one or more algorithms using one or more values of parameters that may have been initially programmed onto the sensor device, and perhaps later updated with information received from the container management network. The step 1106 may include taking into consideration other conditions, including, for example, the time of day, day of week, month or year, updated software or parameter values received from the container management network, user input, other conditions, or a suitable combination thereof. The analysis performed in the step 1106 may include any of the analysis described herein, for example, in relation to FIG. 10, including, but not limited to: determining a change in location; determining whether damage has occurred to the container and/or sensor device; during the preparation state 1004, determining the occurrence and the quality of cleaning performed on a container and/or conducting quality testing on the container; during the filling production state 1006, detecting whether and when a filling event has occurred; during the monitor-at-customer state 1010, determining whether and when a mixing event and/or emptying event have occurred.

Performance of the step 1106 may result in a determination that the defined state of container must be changed, e.g., as described in relation to any of the defined states described in relation to FIG. 10, and this change of state may be one of the actions taken in a step 1107. Other actions may include, for example: powering down, powering up or adjusting behavior of a sensor, component of a sensor device or device coupled thereto, controlling an action to be taken on the container (e.g., cleaning, emptying, filling, movement, etc.), e.g., by controlling one or more automated devices coupled to the sensor device, activating an alarm (e.g., a visual, sound or noise), other actions, or any suitable combination of the foregoing. It should be appreciated that different actions may be taken for the same determined property based on the current defined state and/or other conditions such as, for example, the time of day, day or week, month or year, updated software or parameter values received from the container management network, user input, other conditions, or a suitable combination thereof.

In the step 1107, any actions determined in the step 1106, including changing the defined state, may be taken based on the analysis of the one or more detected properties, which may be based at least in part on the current defined state.

In the step 1108, status information may be stored on the sensor device, for example, in non-volatile memory of the sensor device. The status information can be any current status information about the container, including current location (e.g., one or more network identifiers for a mobile telephony network, Wi-Fi network, ISM network or other), any other property detected or other information generated by analysis performed on the detected properties.

In the step 1110, the status information may be transmitted to the container management network (e.g., a gateway of the network) if possible; i.e., if a communication path can be established with the container management network. The step 1110 may be performed at specific predefined times, for example, at predefined intervals (e.g., every x seconds, minutes, hours or days, etc.), at one or more specific times of a day, and/or specific days of a week, month or year, in response to a request or other information received from the container management network, e.g., a gateway of the system 900, or in response to an event, e.g., an interrupt caused by the movement sensor 216 or another component of the sensor or a component external thereto. In some cases, a network may be down or the sensor device may be out-of-range of a network (e.g., not within range of a Wi-Fi access point, not within range of a cell tower, obstructed from a satellite feed, etc.), in which case the status information will not be transmitted until a later time at which a communication path can be established. In some embodiments, in the event status information cannot be transmitted when desired, the sensor device may be configured to try again at a predetermined amount of time from the current failed attempt, for example, at a time different than (e.g., before) a next attempt would regularly be scheduled. In some embodiments, only information that has changed since a last communication of status information to the container management network may be transmitted in the step 1110. In some embodiments, the status information may be transmitted as a transaction record, for example as a blockchain transaction.

In response to the sensor device transmitting the status information to the container management network, in the step 1111 information may be received from the network. Such received information may include updates or other changes to the software (e.g., including firmware) and/or software parameters that define functionality and behavior of the sensor device, including software and/or parameters for specific components of the sensor device, for example, components of the IPU 204 or the USC 218. Such information also may include instructions for actions to be taken by the sensor device. In some embodiments, information may be received from the container management network independent of any status information being transmitted to the network from the sensor device, for example, at any time during the performance of the method 1100 after the sensor device is initialized in the step 1102, and in some cases initializing the sensor device in the step 1102 may include using information received from the container management network. Receiving information from the container management network enables any of a variety of adaptations to be made to the sensor device during its lifecycle, for example, per the desire of an OEM or a customer, which can improve or otherwise adapt services over time.

In some embodiments of the system described herein, software and/or software parameters transmitted to the sensor service may be digitally signed by an authorized entity of the container management network. In such embodiments, steps 1112 and 1113 may include determining whether the information received from the container management network includes any updated software and/or software parameters, and if so, whether the updated software and/or software parameters are authentic. Determining whether the updated software and/or software parameters are authentic may include verifying the digital signature with which the software and/or software parameters are signed, for example, by certification of a digital certificate of the digital signature, e.g., with a certifying authority, and/or by employing symmetric (e.g., shared secret) and/or asymmetric (e.g., public/private keys) cryptographic techniques on the digital signature. If it is determined that the updated software and/or parameters are authentic, then, in a step 1113, the sensor device may be updated with the updated software and/or parameters and the software may be locked—i.e., secured so that it cannot be modified or otherwise tampered with by an unauthorized individual or other entity. In the step 1117, the sensor device may be updated with other information (i.e., other than software or software parameters) communicated from the sensor device. If the received information does not include updated software and/or parameters or if such updated software and/or parameters is determined to not be authentic, then the method 1100 may proceed to the step 1117.

In some embodiments of the system described herein, any information received in the step 1111 from the container management is digitally signed, not just updated software and/or updated software parameters, such that the received information must be proven authentic before being applied to the sensor device. Any of the authentication steps and/or the locking of the software may be performed using a TPM or another secure cryptographic component included in the sensor device, for example, the TPM 212 of the sensor device 200.

It should be appreciated that the step 1117 may be performed before or concurrently at least in part with any of the steps 1112-1115. Further, while the steps 1106 and 1107 are depicted as discrete steps performed in series as part of a series of steps of the method 1100 in FIG. 11, it should be appreciated that such depiction is for illustrative purposes, and the invention is not so limited. The steps 1106 and 1107 may be performed at different times during performance of the method 1100, for example, after or concurrently with the steps 1108-1117. In some embodiments, the steps 1106 and 1107, or portions thereof, may be performed prior to the steps 1110 and/or 1111 as illustrated, and again after receiving information from the container management network in a step 1111 and/or after performance of step 1112-1117. When analyzing detected properties and taking determined action, if any, after information is received from the container management network, the analysis and/or action may take into account the information received. For example, components within a container management network, for example, one or more servers, gateways, sensor devices or other devices, may perform part or all of the analysis described in the step 1106, and provide in the information received in the step 1111 instructions of actions to be taken by the sensor device, or other information that will result in the sensor device changing behavior, for example, a changed parameter value or software. It should be appreciated that analysis may be shared between the sensor device, gateway, servers or other components of the container management network. For example, a gateway may determine that the defined state should be changed from one state to another state based on information transmitted from the sensor device in the step 1110. The sensor device may be configured to perform some analysis based on the properties detected in the step 1105, and transmit the status information to the gateway in the step 1110, and to execute one or more steps specific to the changed state in response to information indicating the changed state received from the gateway in the step 1111.

Referring again to the orange concentrate example, it may be known that, while the orange concentrate is at a customer site, the aforementioned top liquid layer and solid particle layer will need to be mixed in the container to produce a desired consistency, e.g., by introducing air bubbles into the concentrate. During this mixing procedure, the surface of the top layer may fluctuate as a result of the mixing and the surface of the bottom layer may disappear altogether. It further may be known that prior to mixing, the surface of the top liquid layer will be relatively low in relation to a reference level, and after mixing the surface will be relatively close to the reference level. The sensor device may be configured to recognize by interpreting the detected properties whether the mixing event has not yet occurred, is occurring or has already occurred during the monitor-at-customer state 1010; take any required action in the step 1107; and store and report this analysis as part of the steps 1108 and 1110, respectively. Further, it may be known that the container will be emptied while at a customer site using pumps that will cause the container and/or concentrate therein to vibrate, which may cause waves at the surface of the concentrate. Further, it is known that the liquid fill level during the emptying event should be lower over time, albeit with fluctuations caused by vibration. The sensor device may be configured to recognize whether or not the emptying event has already occurred, is occurring or is yet to occur by interpreting the input from its sensors during the monitor-at-customer state 1010; take any required action in the step 1107; and store and report the occurrence of such an event as part of the steps 1108 and 1110, respectively. The analysis performed in relation to the mixing and/or emptying event described above may include any of: determining whether any vibration has occurred, e.g., based on input from a movement sensor (e.g., the movement sensor 216); detecting the level of the surface of the concentrate (i.e., the level of surface of the top liquid layer), including recognizing that the surface of the bottom solid particle layer produces a stronger reflection than a reflection from a surface of the surface of the top liquid layer; detecting a change in concentrate fill level, if any, over a period of time, taking account of the fluctuations at the surface of the concentrate, if any; comparing measured fill levels against reference levels to determine distance from same. Such analysis may involve analyzing a plurality of fill measurements and other properties detected or calculated over time. It should be appreciated that, while the example of orange concentrate is used herein, method 1100 and the other methods and components described herein may be applied to other materials as well. For example, the descriptions of processing relating to filling, mixing and emptying events described herein could apply to a variety of other materials, including, for example, lacquer, coatings and cosmetics, to name a few.

Alternatively to performing all of the analysis on the sensor device, the sensor device could report one or more detected properties, including fill measurements (e.g., in the form or an array or values), movement detection and other information gleaned from analysis of the detected properties to the container management network, e.g., in the step 1110, and one or more components of the network may determine the state and/or whether the mix or emptying events have not occurred yet, are occurring or have already occurred. It should be appreciated that the foregoing process and variations thereof may apply to any of a plurality of detected events in various defined states of a container lifecycle, such as, for example, the filling of a container, cleaning of a container, movement of a container, other events or any suitable combination of the foregoing, and are intended to fall within the scope of the invention.

FIG. 12 is a flowchart illustrating an example of a method 1200 of implementing a deep sleep mode of operation for a sensor device, according to embodiments of the system described herein. Other embodiments of a method of implementing a deep sleep mode of operation for a sensor device, for example, variations the method 1200, are possible and are intended to fall within the scope of the invention. In a step 1201, the state of a sensor device may transition to the idle state 1001. This transition to the idle state 1001 may be from any of the active states described above in relation to FIG. 10, for example in response to conditions described above in relation to FIG. 10 or 11. In some embodiments, the idle state 1001 may be the default state with which a sensor device is initialized.

In a step 1202, movement may be detected (e.g., by the movement sensor 216) or wake-up signal may be received (e.g., from the timer component 213) at a predetermined time and/or interval. For example, as described below in relation to FIG. 13, the timer component 213 of the sensor device may set a wake-up timer for one hour, several hours, once a day, less than one hour or other elapsed times from a time immediately following the powering down of the sensor device that are not necessary for waking up the sensor device. In some embodiments, it may be desirable to set the amount of elapsed time to 3599 seconds, the reasons for which are explained in more detail below.

In a step 1204 the state may be set to an active state, for example, a last state in which the sensor device was set prior to transitioning to the idle state, which may have been stored and retained in a non-volatile of the sensor device (e.g., of the IPU 204) prior to a transition to the idle state 1001. In a step 1205, one or more of the components of the sensor device may be powered on, including any of those described in relation to FIGS. 2 and 3, for example, one or more sensors and interfaces to same, one or more of the network interfaces 206 and USC 218. Which components to turn on may depend, at least in part, on the state set in the step 1204 and functionality and parameter values with which the sensor device has been configured. The steps 1204 and 1205 collectively may be considered as activating the sensor device, and may be performed concurrently at least in part or in a reverse order than the order displayed in FIG. 12.

In a step 1206, one or more other properties (in addition to movement) of the container may be detected, for example, by the one or more sensors powered on in the step 1205, and, in a step 1208, these detected properties may be analyzed. The properties detected in the step 1206 and the analysis performed in a step 1208 may be any of those described herein, and may depend on the current state, for example as described in relation to FIGS. 10, 11 and/or elsewhere herein. In a step 1210, the detected information, information determined from the analysis performed in the step 1208, and the current time may be stored on the sensor device, for example in a non-volatile memory thereof. It should be appreciated that the current time may be determined any time a property is detected, information determined, or any other action is taken as described herein, and such current time may be recorded and/or transmitted along with information pertaining to the detected property and/or action.

In a step 1212, it may be determined whether there is connectivity to a container management network, for example, a gateway or server of the system 900. The determination may be made using a network interface 206 of the IPU 204, for example, a Wi-Fi and/or cell phone interface thereof. In some embodiments, if more than one communication channel can be established to the container management network, one may be selected based on any number of factors, for example, cost, speed, throughput capacity and available bandwidth. For example, a communication path through a Wi-Fi connection may be chosen over a cell phone network communication path based on lower cost and/or better throughput capacity. If it is determined in the step 1212 that there is no network connectivity, then the method 1200 may proceed to step 1201 in which the sensor device returned to the idle state 1001.

If it is determined in the step 1212 that there is network connectivity, then in a step 1214 status information (e.g., any of the information described above in relation to the steps 1206, 1208, 1210) may be transmitted to the container management network, for example, a gateway or server of the system 900 described above in relation to FIG. 9A.

In a step 1216, it may be determined whether to have the sensor device remain awake, for example, based on the status information and/or information received back from the container management network, if any. If it is determined to not remain awake, then the method 1200 may proceed to the step 1201 in which the sensor device may be returned to the idle state 1001. If it is determined to remain awake, then the method 1200 may proceed to a step 1218, in which sleep mode may be exited, which may result in the current state (set in the step 1204) being processed, for example, as described in relation to FIG. 10 and/or FIG. 11. For example, exiting deep sleep mode in the step 1218 may result in a return to the step 1105 of the method 1100.

The steps of the method 1200 may be performed repeatedly (i.e., cyclically) until in the step 1218 it is determined to exit deep sleep mode. The sensor device 200 may be configured to perform each iteration in about one second, and to remain in an idle state for about 3599 seconds before being woken in the step 1202. Thus, the steps of the method 1200 may repeatedly performed in about one hour (3600 seconds) during which the sensor device remains active for about one second and idle for about 3599 seconds. That is, the sensor device may be active less than 0.03% of the cycle; i.e., during deep sleep mode, resulting in low power consumption.

FIG. 13 is a flowchart illustrating an example of a method 1300 of transitioning a sensor device to an idle state (e.g., the idle state 1002), according to embodiments of the system described herein. Other embodiments of transitioning a sensor device to an idle state, for example, variations of the method 1300, are possible and are intended to fall within the scope of the invention. In a step 1304, components of the sensor device that are not needed for waking up the sensor device may be powered down (e.g., switched off). For example, with reference to the sensor device 200 of FIG. 2, all components except for the timer component 213, movement sensor 216 and the CPU 208 may be powered down, including all the network interface components 206, the sensors 210, 220, the USC 218, the TPM 212 and integrated ambient light sensor 214. In some embodiments, it may be desirable to not switch off all such components. For example, it may be desirable to leave the integrated ambient light sensor 214 powered-on to be able to detect tampering or damage to the sensor device 200, as described elsewhere herein. During such an idle state, because network interfaces 206 are powered-down, no communications is sent/received from/at the sensor device, no sensor input is received from the powered-down sensors and no sensor input analyzed (e.g., by the powered-down USC 218) such that power can be conserved. The powered-down components may be woken up in response to various conditions, as is described elsewhere herein.

In a step 1306, a wake-up timer may be set. For example, the timer component 213 may be configured to interrupt the CPU 208 after a certain amount of elapsed time and/or at specific times of day, week, month or year. In embodiments of the system described herein in which a container management network is employed, the wake-up timer for a sensor device may be configured to coincide with a schedule of a time slot during which the sensor device is scheduled to communicate (e.g., report) information to a gateway, for example, as part of a transaction record, as described in more detail elsewhere herein. For example, the wake-up time may be set to about one hour, several hours, once a day, less than one hour or other elapsed times. In some embodiments, it may be desirable to set the amount of elapsed time to 3599 seconds, for example, for reasons described above in relation to FIG. 12.

In a step 1308, a movement interrupt may be set, for example, on a movement sensor (e.g., the movement sensor 216) to interrupt the CPU 208 in response to detecting movement. In a step 1310, the defined state of the sensor device may be changed to the idle state.

By powering off all (or nearly all) sensor device components not needed to wake-up the sensor device, power may be conserved. Further, in embodiments in which commercial communications networks (e.g., mobile telephone networks) are employed, the amount of commercial (e.g., cellular) charges may be reduced by reducing the use of communication services as a result of powering down the network communication interfaces on the sensor device. The amount of power and/or money conserved/saved may be controlled to some extent by configuring the active/idle times within a cycle, which may be balanced against the desire or need to have the most current container status information. Further, by powering down and thus reducing the amount of time during which components of the sensor device is active, the useful life of these components may be extended.

Various embodiments of the system described herein may be combined to realize substantial communication cost savings for a customer. For example, consider a fleet of 10,000 IBCs owned by an OEM being monitored and managed using the container management network 900, employing sensor devices as described in relation to FIGS. 2-8, and employing the lifecycle management techniques described in relation to FIGS. 10-13, of which: 1,000 IBCs are in a deep sleep mode at an OEM site awaiting to be prepared for use; 400 are in a deep sleep mode being transported from an OEM site to a customer site; 600 are in a deep sleep mode being transported from a customer site back to an OEM site; and 8,000 are at customer sites, 3,000 of which are connected to the container management network via a cellular telephony network, and 5,000 via only a Wi-Fi network path. In this example, the 2,000 containers in deep sleep mode would generate negligible communication charges, and the 5,000 containers communicating with the container management network via only Wi-Fi should generate no additional communication charges. Only the 3,000 containers communicating with the container management network using a cellular telephony network would generate communication charges, which would represent about 70% communication savings compared to the system without a deep sleep mode of operation in which all communications utilize a cellular telephony network.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions.

Software implementations of the system described herein may include executable code that is stored on one or more computer readable media and executed by one or more processors. Each of the one or more computer readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. In some embodiments of the system described herein, one or more computer media may be, include, or be included within a TPM of a server, gateway, sensor device or other component of a container management network, as described in more detail elsewhere herein, providing a secure environment for storing, executing and updating software implementations of the system described herein. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of managing a lifecycle of a container, comprising:
    providing a sensor device that is physically coupled to the container and that determines one or more current properties of the container, the sensor device being remotely coupled to a container management network and including a trusted platform module (tpm) that enables secure communication with the container management network;
    defining a plurality of states, each state corresponding to a particular phase in the lifecycle of the container;
    communicating one or more current properties of the container to the container management network using the tpm to enable secure communication while a current defined state of the container is in a first defined state of the plurality of defined states; and
    controlling an action associated with the container based on at least the first defined state and the one or more current properties of the container.

2. The method according to claim 1, wherein determining one or more current properties of the container includes determining a current fill level of the container and information about at least one other current physical property of the container.

3. The method according to claim 1, wherein controlling an action includes changing the defined state of the container from the first defined state to a second defined state of the plurality of defined states.

4. The method according to claim 1, further comprising:
    setting the current defined state to an idle state; and
    powering down one or more of the plurality of components of the sensor device in accordance with the current defined state being the idle state.

5. The method according to claim 4, wherein powering down one or more of the plurality of components of the sensor device includes powering down all of the components of the sensor device except for components required to wake-up the sensor device.

6. The method according to claim 4, further comprising:
    waking up the sensor device in response to detection of movement or to reaching a predefined time;
    in response to waking up the sensor device, powering on one or more of the plurality of one or more powered-down components, and setting the current defined state to the first defined state; and
    determining whether or not to return the current state to the idle state based on the determined one or more properties.

7. The method according to claim 1, wherein the defined states include at least one state corresponding to at least one of the following: production of the container, preparation and/or filling of the container, monitoring the container at a customer site, and transport of the container.

8. The method according to claim 1, wherein controlling an action includes controlling the action based at least in part on information received from the management network.

9. The method according to claim 1, wherein determining one or more current properties of the container is performed multiple times over a period of time, the method further comprising:
    estimating an expiration date or use-by date of contents of the container based at least in part on the current properties of the container determined multiple times over a period of time.

10. The method according to claim 1, wherein the first defined state is a state during which contents of the container are consumed at a customer site, the method further comprising:
    tracking a number of times an emptying event of the container occurs during the first defined state.

11. The method according to claim 1, further comprising:
communicating information about the container to the one or more devices of a container management network as transaction blocks of a blockchain.

12. The method according to claim 1, further comprising: transmitting sound waves into the container, wherein determining one or more current properties of the container includes detecting sound waves from the container in response to acoustic stimulation of the container to determine the one or more properties.

13. The method according to claim 1, wherein the tpm stores or creates credentials and secrets for secure communication with the container management network.

14. The method according to claim 1, wherein the tpm signs files to secure integrity and authenticity of services provided by the container management network.

15. The method according to claim 1, wherein the tpm facilitates updates of firmware, software and parameters of the sensor device.

16. One or more non-transitory computer-readable media having software stored thereon for managing a lifecycle of a container having a sensor device physically coupled thereto that determines one or more current properties of the container, the sensor device being remotely coupled to a container management network and including a trusted platform module (tpm) that enables secure communication with the container management network, the software comprising:
executable code that defines a plurality of states, each state corresponding to a particular phase in the lifecycle of the container;
executable code that communicates one or more current properties of the container to the container management network using the tpm to enable secure communication while a current defined state of the container is in a first defined state of the plurality of defined states;
executable code that controls an action associated with the container based on at least the first defined state and the one or more current properties of the container.

17. The one or more non-transitory computer-readable media according to claim 16, wherein the executable code that determines one or more current properties of the container includes executable code that determines a current fill level of the container and executable code that determines information about at least one other current physical property of the container.

18. The one or more non-transitory computer-readable media according to claim 16, wherein the executable code that controls an action includes the executable code that changes the defined state of the container from the first defined state to a second defined state of the plurality of defined states.

19. The one or more non-transitory computer-readable media according to claim 16, further comprising:
executable code that sets the current defined state to an idle state; and
executable code that controls powering down one or more of the plurality of components of the sensor device in accordance with the current defined state being the idle state.

20. The one or more non-transitory computer-readable media according to claim 19, wherein the executable code that controls powering down one or more of the plurality of components of the sensor device includes executable code that controls powering down all of the components of the sensor device except for components required to wake-up the sensor device.

21. The one or more non-transitory computer-readable media according to claim 19, further comprising:
executable code that wakes up the sensor device in response to detection of movement or to reaching a predefined time;
executable code that, in response to waking up the sensor device, powers on one or more of the plurality of one or more powered-down components, and sets the current defined state to the first defined state; and
executable code that determines whether or not to return the current state to the idle state based on the determined one or more properties.

22. The one or more non-transitory computer-readable media according to claim 16, wherein the defined states include at least one state corresponding to at least one of the following: production of the container, preparation and/or filling of the container, monitoring the container at a customer site, and transport of the container.

23. The one or more non-transitory computer-readable media according to claim 16, wherein the executable code that controls the action includes executable code that controls the action based at least in part on information received from the management network.

24. The one or more non-transitory computer-readable media according to claim 16, wherein the executable code that determines one or more current properties of the container determines the one or more current properties multiple times over a period of time, the software further comprising:
executable code that estimates an expiration date or use-by date of contents of the container based at least in part on the current properties of the container determined multiple times over a period of time.

25. The one or more non-transitory computer-readable media according to claim 16, wherein the first defined state is a state during which contents of the container are consumed at a customer site, the software further comprising:
executable code that tracks a number of times an emptying event of the container occurs during the first defined state.

26. The one or more non-transitory computer-readable media according to claim 16, the software further comprising:
executable code that communicates information about the container to the one or more devices of a container management network as transaction blocks of a blockchain.

27. The one or more non-transitory computer-readable media according to claim 16, wherein the executable code that determines one or more current properties of the container includes executable code that controls detecting sound waves from the container in response to acoustic stimulation of the container and analyzes the detected sound waves to determine the one or more properties.

28. The one or more non-transitory computer-readable media according to claim 16, wherein the tpm stores credentials and secrets for secure communication with the container management network.

29. The one or more non-transitory computer-readable media according to claim 16, wherein the tpm signs files to secure integrity and authenticity of services provided by the container management network.

30. The one or more non-transitory computer-readable media according to claim 16, wherein the tpm facilitates updates of firmware, software and parameters of the sensor device.

* * * * *